United States Patent
Nagahara

(10) Patent No.: US 8,379,316 B2
(45) Date of Patent: Feb. 19, 2013

(54) ZOOM LENS FOR PROJECTION AND PROJECTION-TYPE DISPLAY APPARATUS

(75) Inventor: Akiko Nagahara, Saitama (JP)

(73) Assignee: Fujifilm Corporation, Tokyo (JP)

( * ) Notice: Subject to any disclaimer, the term of this patent is extended or adjusted under 35 U.S.C. 154(b) by 107 days.

(21) Appl. No.: 13/161,048

(22) Filed: Jun. 15, 2011

(65) Prior Publication Data
US 2011/0304921 A1    Dec. 15, 2011

(30) Foreign Application Priority Data

Jun. 15, 2010 (JP) .................................. 2010-136206
Jun. 13, 2011 (JP) .................................. 2011-130931

(51) Int. Cl.
*G02B 15/14* (2006.01)
(52) U.S. Cl. .......................... 359/680; 359/681; 359/684
(58) Field of Classification Search .................. 359/680, 359/681, 682, 684
See application file for complete search history.

(56) References Cited

U.S. PATENT DOCUMENTS 7,576,921 B2    8/2009  Inoko
7,605,985 B2 *  10/2009 Nagahara et al. ............. 359/680
7,826,147 B2 *  11/2010 Ichimura et al. .............. 359/676
8,179,607 B2 *  5/2012  Amano .......................... 359/650
2011/0149411 A1 * 6/2011  Inoko ............................ 359/680

FOREIGN PATENT DOCUMENTS

JP   2004-226803   8/2004
JP   2006-162700   6/2006

* cited by examiner

*Primary Examiner* — David N Spector
(74) *Attorney, Agent, or Firm* — Young & Thompson

(57) ABSTRACT

A zoom lens for projection includes a negative magnification-side lens group fixed while magnification is changed, a plurality of lens groups that move while magnification is changed, and a positive reduction-side lens group fixed while magnification is changed which are arranged in this order from the magnification side. The magnification-side lens group is composed of a negative front-group and a positive rear-group, arranged in this order from the magnification side. The rear-group is composed of a positive lens, a negative lens and a positive lens, arranged in this order from the magnification side, and focusing is performed by moving the rear-group. Further, the following formulas (1) and (2) are satisfied:

$$1.73 < N_{dRpAVE} \quad (1);$$

and $$60 < \nu_{dRn} \quad (2),$$

where $N_{dRpAVE}$ is an average value of refractive indices of the positive lenses in the rear-group, and $\nu_{dRn}$ is the Abbe number of the negative lens in the rear-group.

19 Claims, 22 Drawing Sheets

FIG. 4 EXAMPLE 2

FIG. 9 EXAMPLE 5 (WIDE ANGLE END)

FIG. 11 EXAMPLE 6 (WIDE ANGLE END)

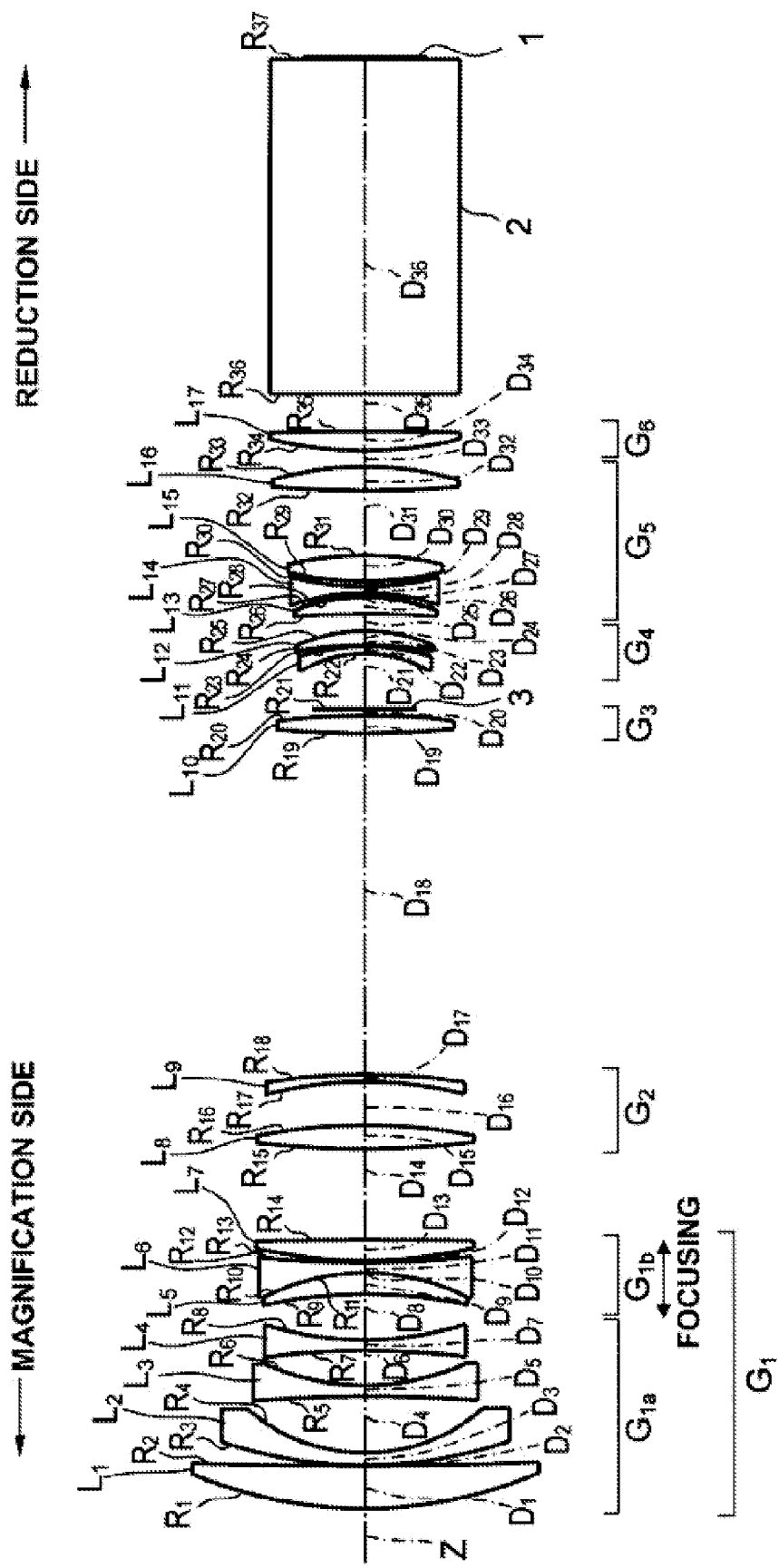

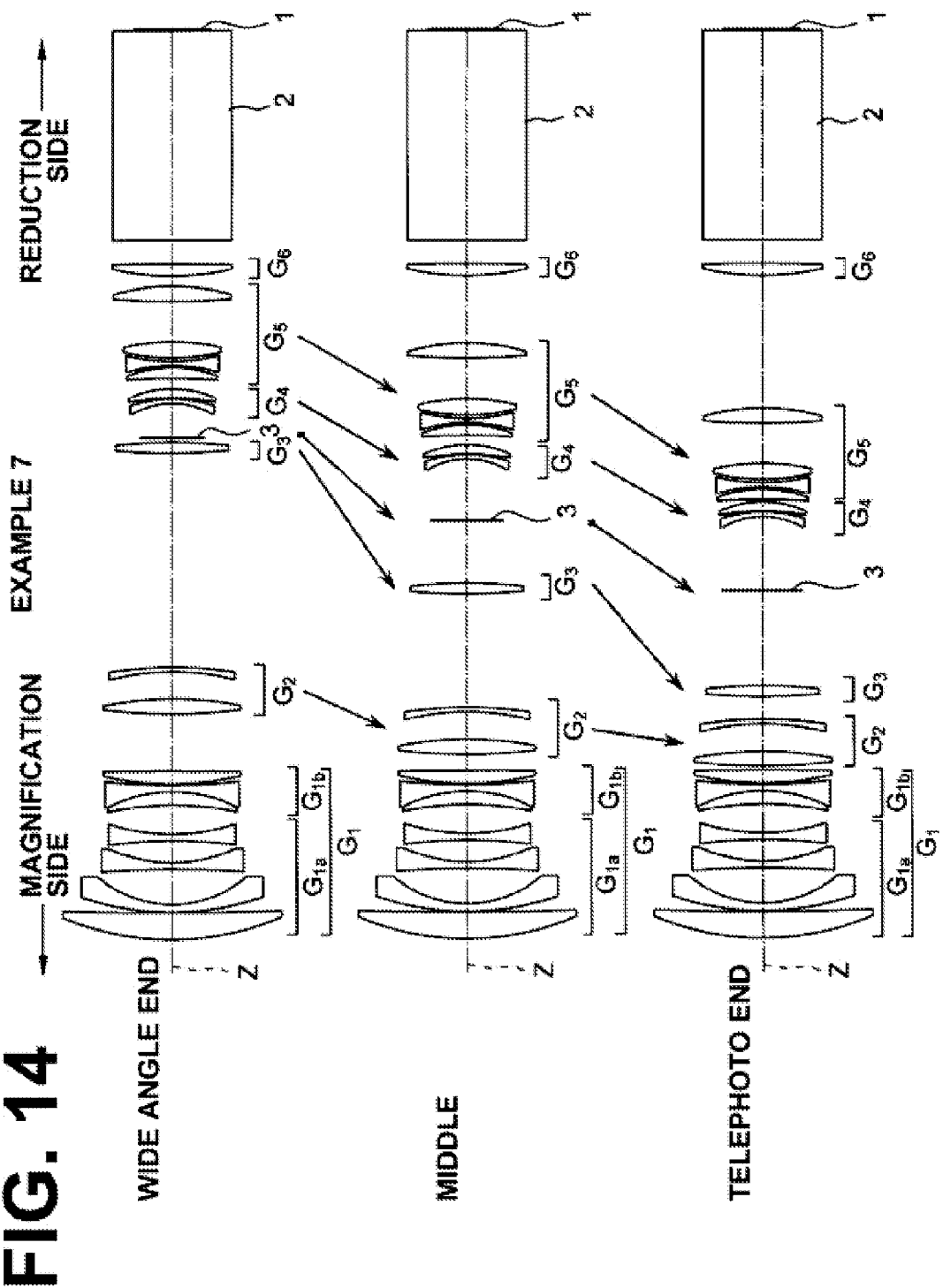

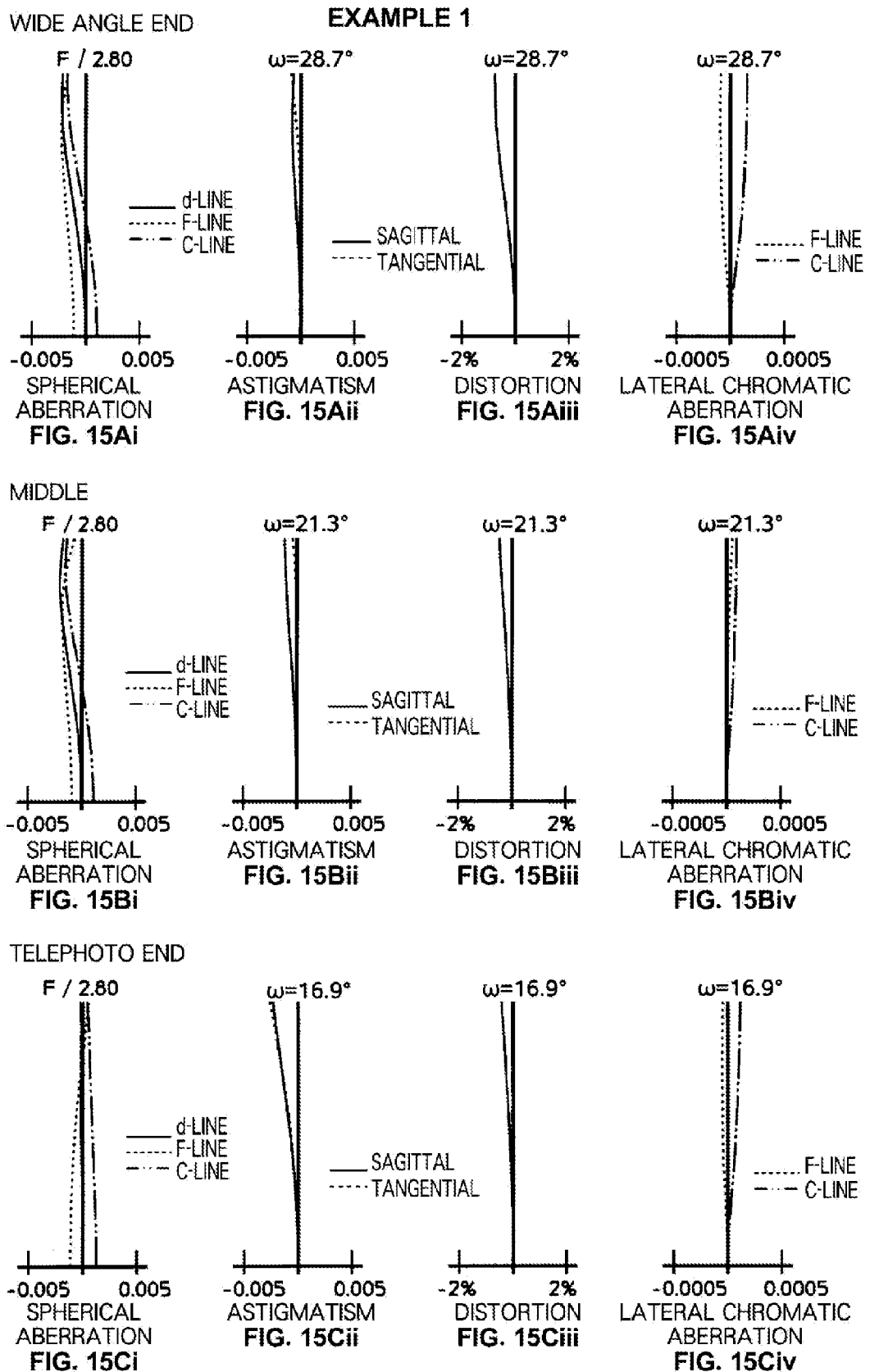

EXAMPLE 2
WIDE ANGLE END
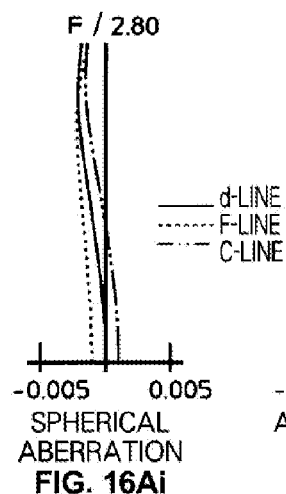
SPHERICAL ABERRATION
FIG. 16Ai
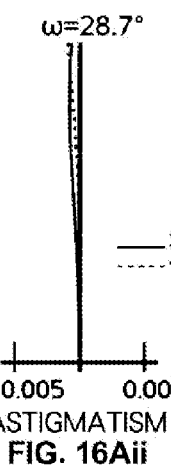
ASTIGMATISM
FIG. 16Aii
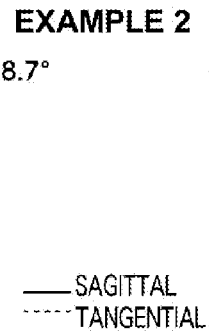
DISTORTION
FIG. 16Aiii
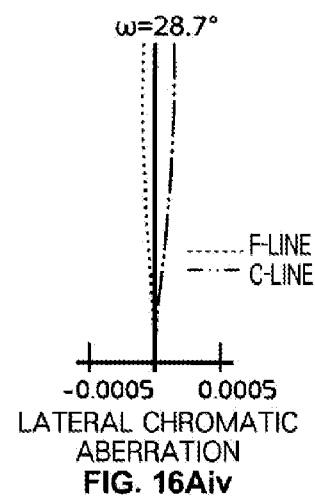
LATERAL CHROMATIC ABERRATION
FIG. 16Aiv
MIDDLE
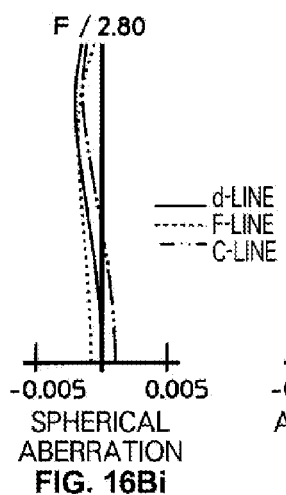
SPHERICAL ABERRATION
FIG. 16Bi
ASTIGMATISM
FIG. 16Bii
DISTORTION
FIG. 16Biii
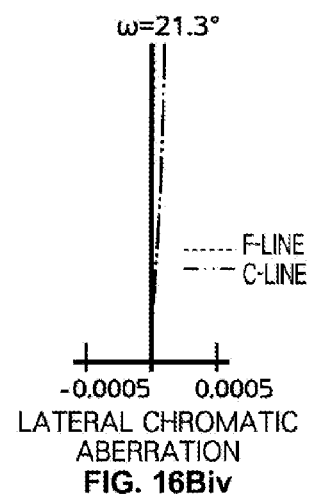
LATERAL CHROMATIC ABERRATION
FIG. 16Biv
TELEPHOTO END
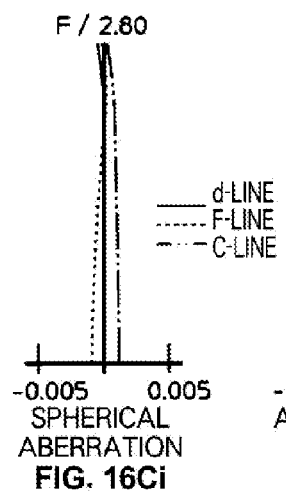
SPHERICAL ABERRATION
FIG. 16Ci
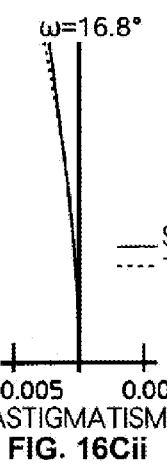
ASTIGMATISM
FIG. 16Cii
DISTORTION
FIG. 16Ciii
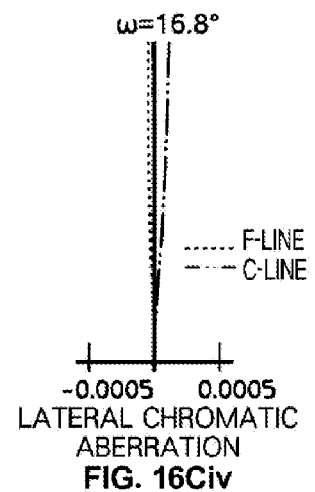
LATERAL CHROMATIC ABERRATION
FIG. 16Civ

EXAMPLE 3

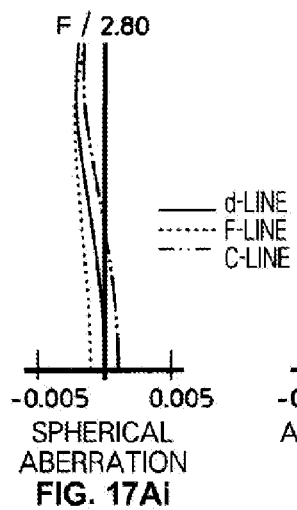

WIDE ANGLE END

FIG. 17Ai — Spherical Aberration (F/2.80; d-LINE, F-LINE, C-LINE)
FIG. 17Aii — Astigmatism (ω=28.7°; SAGITTAL, TANGENTIAL)
FIG. 17Aiii — Distortion (ω=28.7°)
FIG. 17Aiv — Lateral Chromatic Aberration (ω=28.7°; F-LINE, C-LINE)

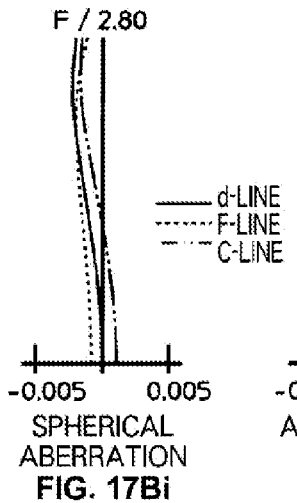

MIDDLE

FIG. 17Bi — Spherical Aberration (F/2.80; d-LINE, F-LINE, C-LINE)
FIG. 17Bii — Astigmatism (ω=21.3°; SAGITTAL, TANGENTIAL)
FIG. 17Biii — Distortion (ω=21.3°)
FIG. 17Biv — Lateral Chromatic Aberration (ω=21.3°; F-LINE, C-LINE)

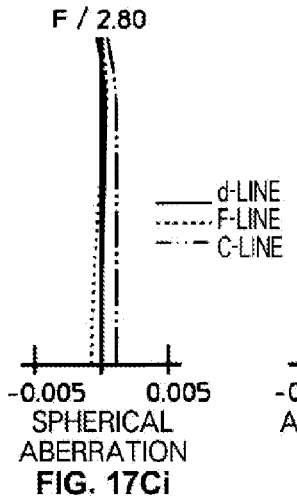

TELEPHOTO END

FIG. 17Ci — Spherical Aberration (F/2.80; d-LINE, F-LINE, C-LINE)
FIG. 17Cii — Astigmatism (ω=16.8°; SAGITTAL, TANGENTIAL)
FIG. 17Ciii — Distortion (ω=16.8°)
FIG. 17Civ — Lateral Chromatic Aberration (ω=16.8°; F-LINE, C-LINE)

EXAMPLE 4

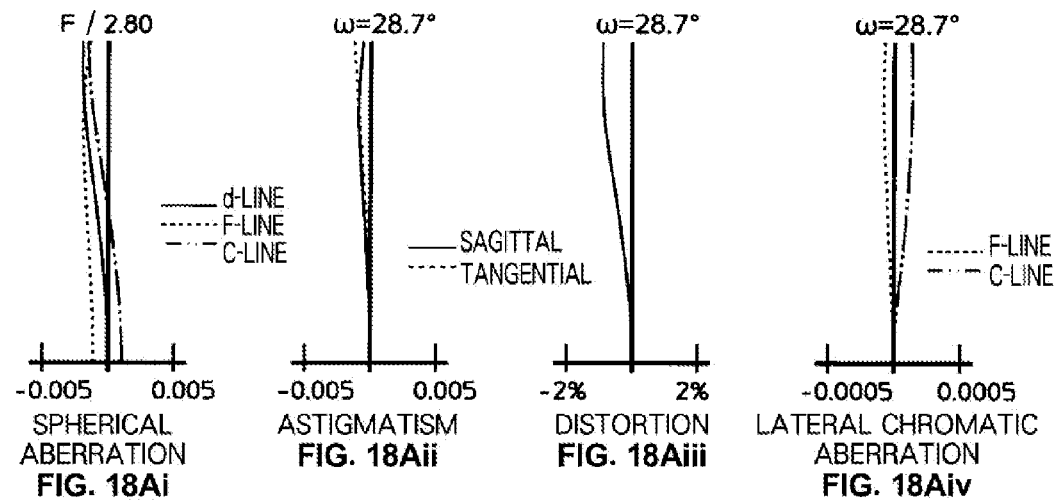

WIDE ANGLE END

FIG. 18Ai — Spherical Aberration
FIG. 18Aii — Astigmatism
FIG. 18Aiii — Distortion
FIG. 18Aiv — Lateral Chromatic Aberration

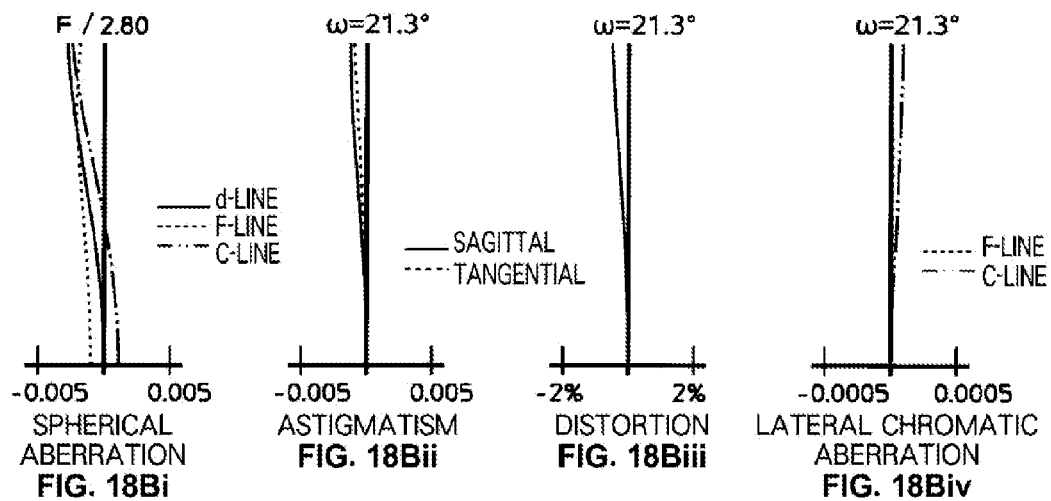

MIDDLE

FIG. 18Bi — Spherical Aberration
FIG. 18Bii — Astigmatism
FIG. 18Biii — Distortion
FIG. 18Biv — Lateral Chromatic Aberration

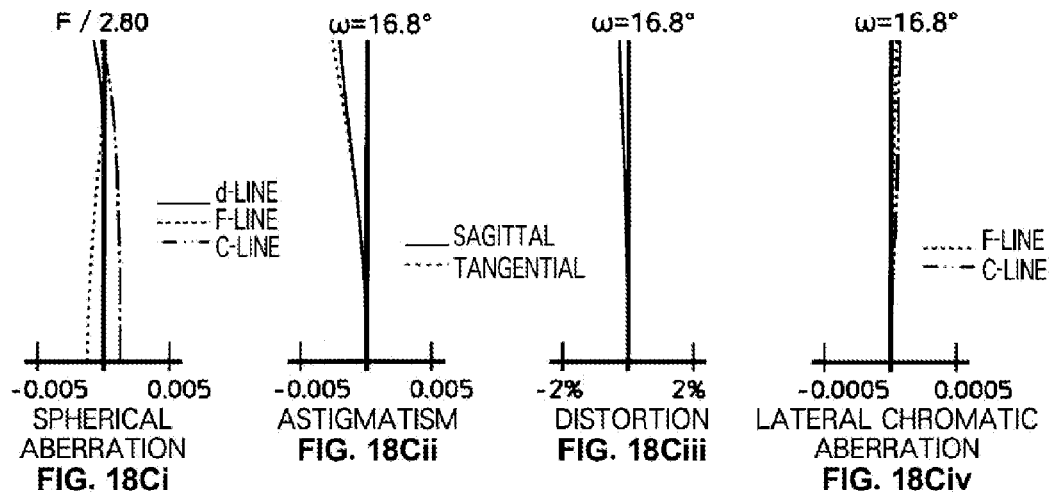

TELEPHOTO END

FIG. 18Ci — Spherical Aberration
FIG. 18Cii — Astigmatism
FIG. 18Ciii — Distortion
FIG. 18Civ — Lateral Chromatic Aberration

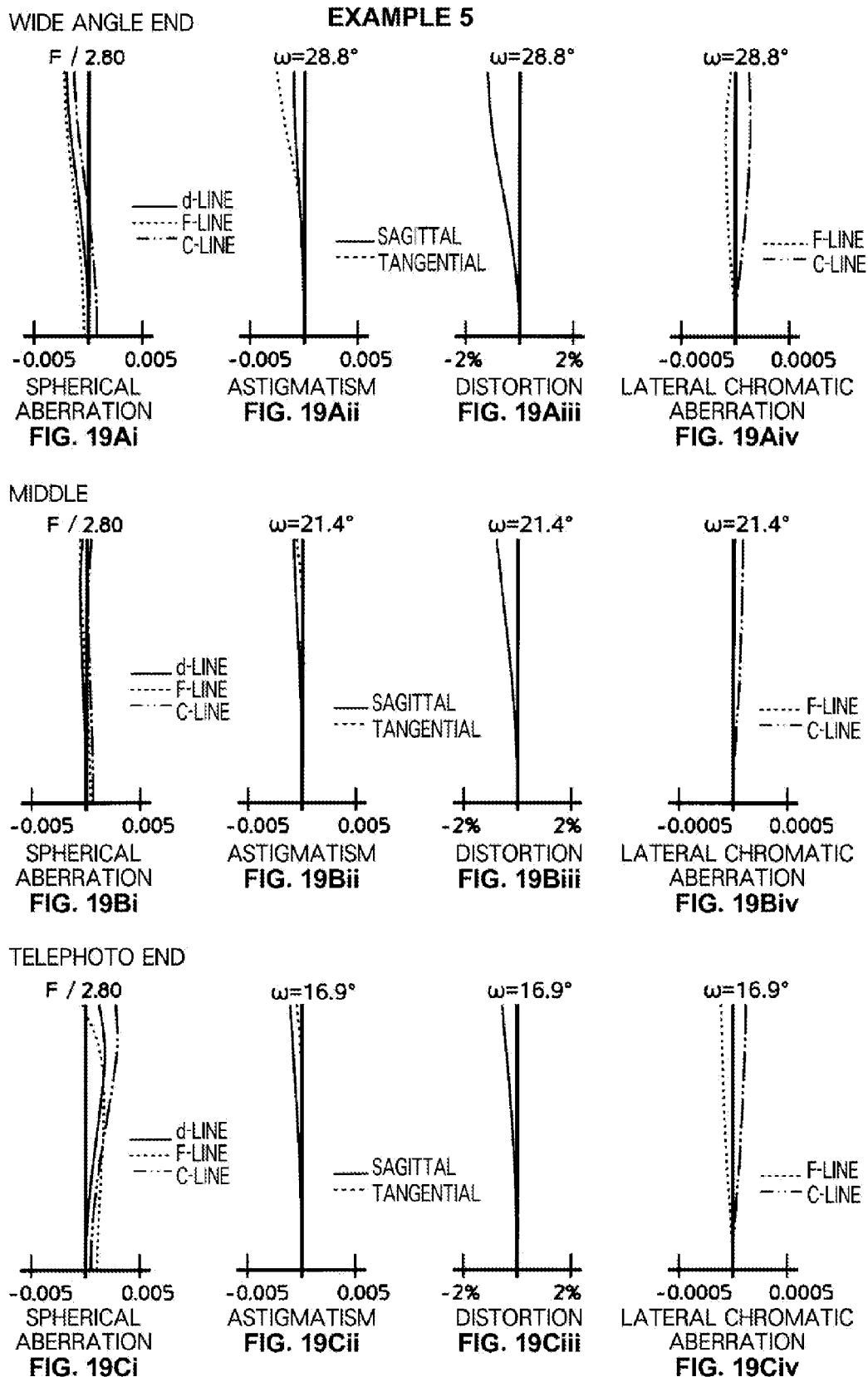

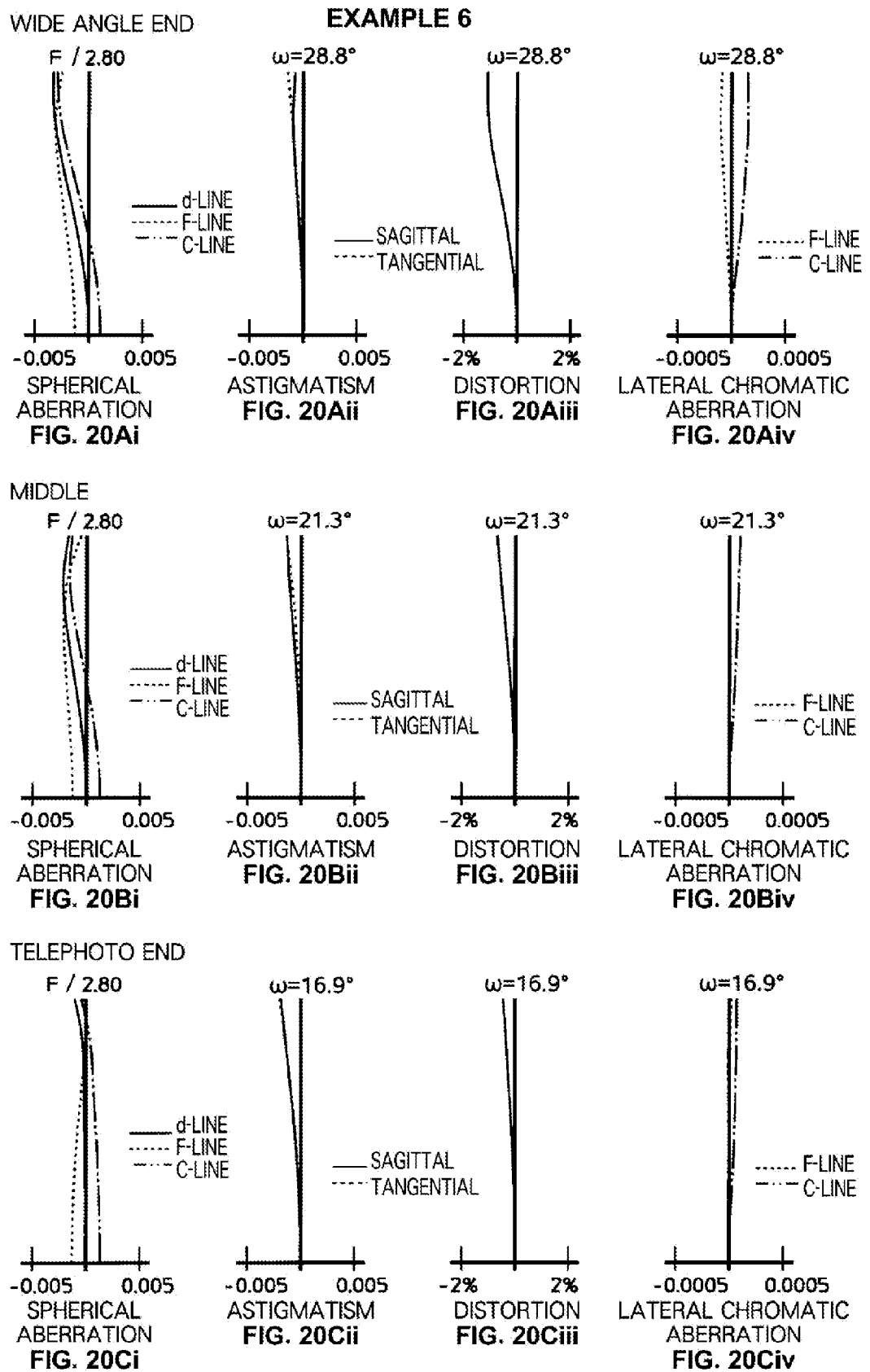

EXAMPLE 7
WIDE ANGLE END
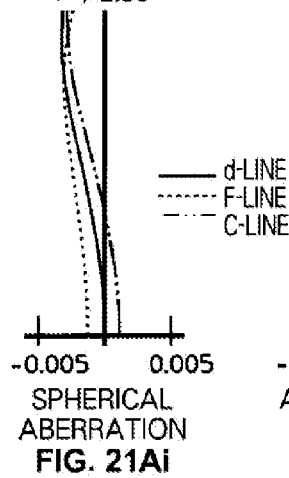
SPHERICAL
ABERRATION
FIG. 21Ai
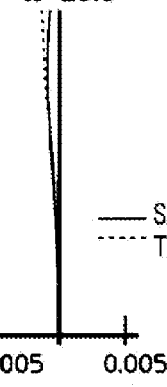
ASTIGMATISM
FIG. 21Aii
DISTORTION
FIG. 21Aiii
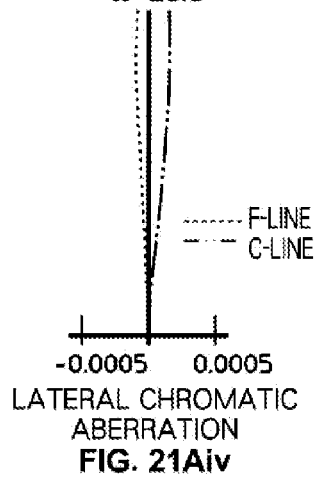
LATERAL CHROMATIC
ABERRATION
FIG. 21Aiv
MIDDLE
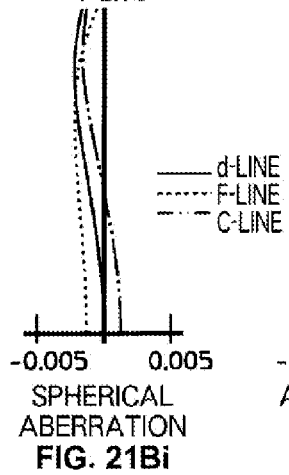
SPHERICAL
ABERRATION
FIG. 21Bi
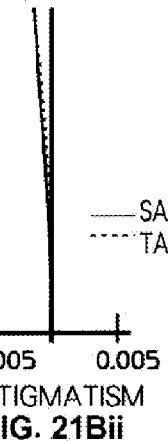
ASTIGMATISM
FIG. 21Bii
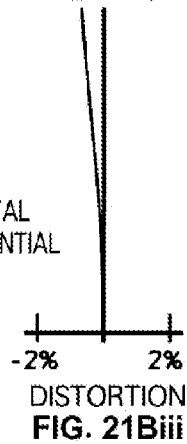
DISTORTION
FIG. 21Biii
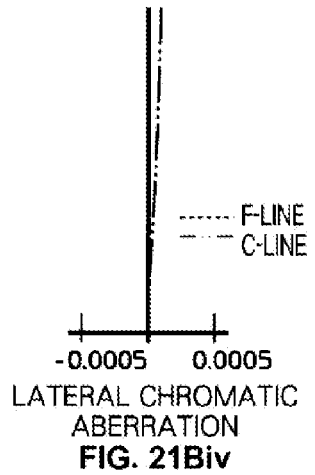
LATERAL CHROMATIC
ABERRATION
FIG. 21Biv
TELEPHOTO END
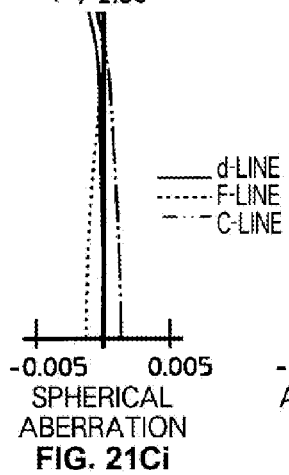
SPHERICAL
ABERRATION
FIG. 21Ci
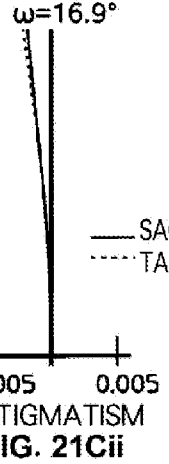
ASTIGMATISM
FIG. 21Cii
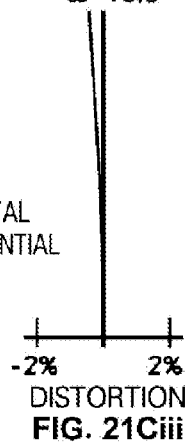
DISTORTION
FIG. 21Ciii
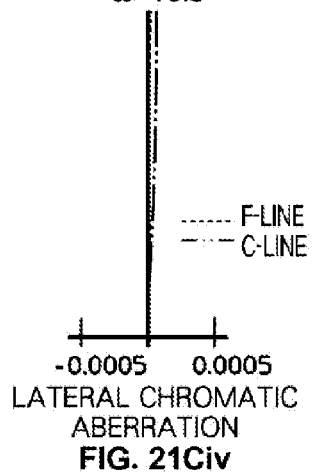
LATERAL CHROMATIC
ABERRATION
FIG. 21Civ

ZOOM LENS FOR PROJECTION AND PROJECTION-TYPE DISPLAY APPARATUS

BACKGROUND OF THE INVENTION

1. Field of the Invention

The present invention relates to a zoom lens for projection especially appropriate for projection onto a large screen in a movie theater or the like, and to a projection-type display apparatus.

2. Description of the Related Art

Conventionally, projector apparatuses (projection-type display apparatuses) using light valves, such as a liquid crystal display device and a DMD (Digital Micromirror Device: Registered Trademark) display device, and which project images by using lenses having relatively long back focus, were widely used.

In recent years, projector apparatuses that can project higher definition images appropriate for large screens gradually started to be used in movie theaters or the like.

The projector apparatuses for such a purpose adopt a reflective liquid crystal display device method or a DMD three panel method. Therefore, projection lenses used in the projector apparatuses need to have longer back focus, and excellent telecentricity similar to other kinds of projector apparatus.

Meanwhile, as a zoom lens for projection used in such a projector apparatus, a zoom lens that is focused by moving a first lens group on the magnification side of the zoom lens is known. However, since the outer diameter of the first lens group is generally large, the weight of the first lens group is heavy. Therefore, when the first lens group is moved to focus the zoom lens, a load on a mechanism for focusing tends to be large. As an attempt to solve such problems, a zoom lens in which a first lens group is divided into a first-lens-group front group and a first-lens-group rear group, arranged in this order from the magnification side, is known (please refer to U.S. Pat. No. 7,576,921 (Patent Document 1) and Japanese Unexamined Patent Publication No. 2004-226803 (Patent Document 2)). In the zoom lens, focusing is performed by moving only the first-lens-group rear group in the direction of an optical axis, while the first-lens-group front group is fixed. Further, a zoom lens in which focusing is performed by moving, in the direction of an optical axis, a lens group (third lens group, for example) that is located on the reduction side of the first lens group and that moves while magnification is changed is known (please refer to Japanese Unexamined Patent Publication No. 2006-162700 (Patent Document 3)).

However, in the zoom lens disclosed in Patent Document 1, the first-lens-group rear group that is moved in focusing is composed of a lens. Therefore, there is a problem that chromatic aberrations caused by focusing are too large.

Further, in the zoom lens disclosed in Patent Document 2, the first-lens-group rear group that is moved in focusing is composed of four lenses, namely, second through fifth lenses in the first lens group. Therefore, a load on the mechanism for focusing is not reduced, compared with the case of moving the whole first lens group.

Further, in the zoom lens disclosed in Patent Document 3, focusing is performed by moving the third lens group, which moves while magnification is changed. Therefore, a lens movement mechanism for focusing, which operates separately from a lens movement mechanism for zooming, needs to be provided in addition to the lens movement mechanism for zooming. Hence, the lens movement mechanisms become enormously complex.

SUMMARY OF THE INVENTION

In view of the foregoing circumstances, it is an object of the present invention to provide a zoom lens for projection that can easily reduce a load on a mechanism for focusing without making the lens movement mechanism complex, and which can correct chromatic aberrations in an excellent manner, and the reduction side of which is telecentric. It is another object of the present invention to provide a projection-type display apparatus.

A zoom lens for projection of the present invention is a zoom lens for projection comprising:

a magnification-side lens group having negative refractive power, and which is fixed while magnification is changed;

a plurality of lens groups that move along an optical axis while magnification is changed; and a reduction-side lens group having positive refractive power, and which is fixed while magnification is changed, the magnification-side lens group, the plurality of lens groups, and the reduction-side lens group being arranged in this order from the magnification side of the zoom lens, wherein the magnification-side lens group is composed of a front group having negative refractive power and a rear group having positive refractive power, which are arranged in this order from the magnification side, and wherein the rear group is composed of a positive lens, a negative lens and a positive lens, which are arranged in this order from the magnification side, and wherein focusing is performed by moving the rear group along the optical axis, and wherein the reduction side of the zoom lens is telecentric, and wherein the following formulas (1) and (2) are satisfied:

$$1.73 < N_{dRpAVE} \quad (1);$$

and $$60 < v_{dRn} \quad (2)$$

where $N_{dRpAVE}$ is an average value of refractive indices of the positive lenses in the rear group with respect to d-line, and $v_{dRn}$ is the Abbe number of the negative lens in the rear group with respect to d-line.

In the zoom lens for projection, it is desirable that the negative lens in the rear group is a double-concave lens, and that the absolute value of the radius of curvature of a magnification-side surface of the negative lens in the rear group is smaller than the absolute value of the radius of curvature of a reduction-side surface of the negative lens in the rear group.

Further, in the zoom lens for projection, it is desirable that the plurality of lens groups that move along the optical axis while magnification is changed are composed of four groups of a positive lens group, a positive lens group, one of a positive lens group and a negative lens group, and a positive lens group, which are arranged in this order from the magnification side. Further, it is desirable that a stop is arranged between a lens group located at a second position from the magnification side of the plurality of lens groups and a lens group located at a third position from the magnification side of the plurality of lens groups.

It is desirable that the zoom lens for projection as a whole is composed of six groups when the magnification-side lens group is regarded as one lens group. Further, it is desirable that when the magnification-side lens group is a first lens group, the following formula (3) is satisfied:

$$-2.5 < f_1/f < -1.5 \quad (3),$$

where $f_1$ is a focal length of the first lens group when projection distance is at infinity, and f is a focal length of the entire system of the zoom lens for projection at wide angle end when projection distance is at infinity.

It is desirable that the zoom lens for projection as a whole is composed of six groups when the magnification-side lens group is regarded as one lens group. Further, it is desirable that when a most-magnification-side lens group of the plurality of lens groups is a second lens group, the following formula (4) is satisfied:

$$4.0 < f_2/f < 7.0 \qquad (4),$$

where $f_2$ is a focal length of the second lens group, and f is a focal length of the entire system of the zoom lens for projection at wide angle end when projection distance is at infinity.

It is desirable that the zoom lens for projection as a whole is composed of six groups when the magnification-side lens group is regarded as one lens group. Further, when a lens group located at a second position from the magnification side of the plurality of lens groups is a third lens group, the following formula (5) is satisfied:

$$5.0 < f_3/f < 8.0 \qquad (5),$$

where $f_3$ is a focal length of the third lens group, and f is a focal length of the entire system of the zoom lens for projection at wide angle end when projection distance is at infinity.

It is desirable that the total number of lens groups in the zoom lens for projection is six when the magnification-side lens group is regarded as one lens group. Further, when a lens group located at a third position from the magnification side of the plurality of lens groups is a fourth lens group and a lens group located at a fourth position from the magnification side of the plurality of lens groups is a fifth lens group, the following formula (6) is satisfied:

$$6.0 < f_{4-5}/f < 9.0 \qquad (6),$$

where $f_{4-5}$ is a combined focal length of the fourth lens group and the fifth lens group at wide angle end, and f is a focal length of the entire system of the zoom lens for projection at wide angle end when projection distance is at infinity.

In the zoom lens for projection, when the plurality of lens groups that move along an optical axis while magnification is changed is composed of four groups of a positive lens group, a positive lens group, one of a positive lens group and a negative lens group, and a positive lens group, which are arranged in this order from the magnification side, and when a stop is arranged between a lens group located at a second position from the magnification side of the plurality of lens groups and a lens group located at a third position from the magnification side of the plurality of lens groups, and when a lens group located at a third position from the magnification side of the plurality of lens groups is a fourth lens group, it is desirable that the fourth lens group is composed of a positive lens and a negative lens.

In the zoom lens for projection, when the plurality of lens groups that move along an optical axis while magnification is changed is composed of four groups of a positive lens group, a positive lens group, one of a positive lens group and a negative lens group, and a positive lens group, which are arranged in this order from the magnification side, and when a stop is arranged between a lens group located at a second position from the magnification side of the plurality of lens groups and a lens group located at a third position from the magnification side of the plurality of lens groups, and when a lens group located at a fourth position from the magnification side of the plurality of lens groups is a fifth lens group, it is desirable that the fifth lens group is composed of a positive lens, a negative lens, a positive lens, and a positive lens, which are arranged in this order from the magnification side.

A projection-type display apparatus of the present invention is a projection-type display apparatus comprising:
a light source;
a light valve; and
a zoom lens for projection, as described above,
wherein the zoom lens for projection projects an optical image of light modulated by the light valve onto a screen.

The expression "magnification side (magnification-side)" refers to the projected side (screen side). Even in reduction projection, the screen side is referred to as the magnification side for convenience. The expression "reduction side (reduction-side)" refers to the original image display area side (light valve side). Even in reduction projection, the light valve side is referred to as the reduction side for convenience.

Further, the expression "the reduction side is telecentric" means a state in which a line bisecting an angle between the upper maximum ray and the lower maximum ray in a cross section of rays condensing into an arbitrary point on an image plane on the reduction side is nearly parallel to an optical axis. Therefore, the state is not limited to a completely telecentric state. In other words, the state is not limited to a state in which the line bisecting the angle is completely parallel to the optical axis, and some difference may be present between the bisecting line and the optical axis. Here, some difference means that the inclination of the bisecting line with respect to the optical axis is within the range of ±3°.

Further, it is not necessary that the "lens group" is composed of plural lenses. The lens group may be composed of a lens.

Further, the expressions "comprising, . . . being arranged", "composed of", "composed of . . . , which are arranged", "composed of four groups", and "composed of six groups" represent substantial construction of the lens system. Therefore, a lens or lenses or a lens group or lens groups that substantially do not have power, an optical element or elements, such as a stop and a cover glass, other than the lens may be included.

As described above, the zoom lens for projection of the present invention and the projection-type display apparatus using the zoom lens for projection adopt an inner focus method, and the magnification-side lens group, which is located on the most magnification side of the zoom lens, and which is fixed while magnification is changed, is divided into a front group and a rear group, arranged in this order from the magnification side. Only the rear group is moved in the direction of the optical axis of the zoom lens to perform focusing. Further, the rear group that is moved in focusing is composed of a positive lens, a negative lens, and a positive lens, which are arranged in this order from the magnification side. Further, the reduction side of the lens system is telecentric.

As described above, focusing is performed by moving only the rear group in the magnification-side lens group, and the rear group is composed of three lenses of a positive lens, a negative lens, and a positive lens. Therefore, it is possible to reduce the weight of the lenses that are moved in focusing. Consequently, it is possible to reduce the load on a mechanism for a focusing operation. Further, the rear group, which is moved in focusing, is fixed while magnification is changed. Therefore, it is possible to simplify the lens movement mechanism, compared with the case in which the group that is moved while magnification is changed is moved also in focusing.

Further, in the rear group composed of three lenses of the positive lens, the negative lens, and the positive lens, the Abbe number of the negative lens with respect to d-line is greater than 60. Further, an average value of the refractive indices of the two positive lenses in the rear group is greater than 1.73. Therefore, it is possible to correct a fluctuation of chromatic aberrations and a fluctuation of curvature of field in an excellent manner.

Further, the zoom lens for projection of the present invention and the projection-type display apparatus using the zoom lens can satisfy a request for making the telecentricity of the reduction side of the lens system excellent.

BRIEF DESCRIPTION OF THE DRAWINGS

FIG. 13 is a diagram illustrating the structure of a zoom lens for projection in Example 7;

FIG. 14 is a diagram illustrating movement positions of lens groups in the zoom lens for projection of Example 7 at wide angle end (WIDE), at middle position (MIDDLE) and at telephoto end (TELE);

FIGS. 15Ai, 15ii, 15Aiii and 15Aiv are diagrams illustrating various aberrations (spherical aberration, astigmatism, distortion, and lateral chromatic aberration, respectively) of the zoom lens for projection in Example 1 at wide angle end (WIDE);

FIGS. 15Bi, 15Bii, 15Biii and 15Biv are diagrams illustrating various aberrations (spherical aberration, astigmatism, distortion, and lateral chromatic aberration, respectively) of the zoom lens for projection in Example 1 at middle position (MIDDLE);

FIGS. 15Ci, 15Cii, 15Ciii and 15Civ are diagrams illustrating various aberrations (spherical aberration, astigmatism, distortion, and lateral chromatic aberration, respectively) of the zoom lens for projection in Example 1 at telephoto end (TELE);

FIGS. 16Ai, 16Aii, 16Aiii and 16Aiv are diagrams illustrating various aberrations (spherical aberration, astigmatism, distortion, and lateral chromatic aberration, respectively) of the zoom lens for projection in Example 2 at wide angle end (WIDE);

FIGS. 16Bi, 16Bii, 16Biii and 16Biv are diagrams illustrating various aberrations (spherical aberration, astigmatism, distortion, and lateral chromatic aberration, respectively) of the zoom lens for projection in Example 2 at middle position (MIDDLE);

FIGS. 16Ci, 16Cii, 16Ciii and 16Civ are diagrams illustrating various aberrations (spherical aberration, astigmatism, distortion, and lateral chromatic aberration, respectively) of the zoom lens for projection in Example 2 at telephoto end (TELE);

FIGS. 17Ai, 17Aii, 17Aiii and 17Aiv are diagrams illustrating various aberrations (spherical aberration, astigmatism, distortion, and lateral chromatic aberration, respectively) of the zoom lens for projection in Example 3 at wide angle end (WIDE);

FIGS. 17Bi, 17Bii, 17Biii and 17Biv are diagrams illustrating various aberrations (spherical aberration, astigmatism, distortion, and lateral chromatic aberration, respectively) of the zoom lens for projection in Example 3 at middle position (MIDDLE);

FIGS. 17Ci, 17Cii, 17Ciii and 17Civ are diagrams illustrating various aberrations (spherical aberration, astigmatism, distortion, and lateral chromatic aberration, respectively) of the zoom lens for projection in Example 3 at telephoto end (TELE);

FIGS. 18Ai, 18Aii, 18Aiii and 18Aiv are diagrams illustrating various aberrations (spherical aberration, astigmatism, distortion, and lateral chromatic aberration, respectively) of the zoom lens for projection in Example 4 at wide angle end (WIDE);

FIGS. 18Bi, 18Bii, 18Biii and 18Biv are diagrams illustrating various aberrations (spherical aberration, astigmatism, distortion, and lateral chromatic aberration, respectively) of the zoom lens for projection in Example 4 at middle position (MIDDLE);

FIGS. 18Ci, 18Cii, 18Ciii and 18Civ are diagrams illustrating various aberrations (spherical aberration, astigmatism, distortion, and lateral chromatic aberration, respectively) of the zoom lens for projection in Example 4 at telephoto end (TELE);

FIGS. 19Ai, 19Aii, 19Aiii and 19Aiv are diagrams illustrating various aberrations (spherical aberration, astigmatism, distortion, and lateral chromatic aberration, respectively) of the zoom lens for projection in Example 5 at wide angle end (WIDE);

FIGS. 19Bi, 19Bii, 19Biii and 19Biv are diagrams illustrating various aberrations (spherical aberration, astigmatism, distortion, and lateral chromatic aberration, respectively) of the zoom lens for projection in Example 5 at middle position (MIDDLE);

FIGS. 19Ci, 19Cii, 19Ciii and 19Civ are diagrams illustrating various aberrations (spherical aberration, astigmatism, distortion, and lateral chromatic aberration, respectively) of the zoom lens for projection in Example 5 at telephoto end (TELE);

FIGS. 20Ai, 20Aii, 20Aiii and 20Aiv are diagrams illustrating various aberrations (spherical aberration, astigmatism, distortion, and lateral chromatic aberration, respectively) of the zoom lens for projection in Example 6 at wide angle end (WIDE);

FIGS. 20Bi, 20Bii, 20Biii and 20Biv are diagrams illustrating various aberrations (spherical aberration, astigmatism, distortion, and lateral chromatic aberration, respectively) of the zoom lens for projection in Example 6 at middle position (MIDDLE);

FIGS. 20Ci, 20Cii, 20Ciii and 20Civ are diagrams illustrating various aberrations (spherical aberration, astigmatism, distortion, and lateral chromatic aberration, respectively) of the zoom lens for projection in Example 6 at telephoto end (TELE);

FIGS. 21Ai, 21Aii, 21Aiii and 21Aiv are diagrams illustrating various aberrations (spherical aberration, astigmatism, distortion, and lateral chromatic aberration, respectively) of the zoom lens for projection in Example 7 at wide angle end (WIDE);

FIGS. 21Bi, 21Bii, 21Biii and 21Biv are diagrams illustrating various aberrations (spherical aberration, astigmatism, distortion, and lateral chromatic aberration, respectively) of the zoom lens for projection in Example 7 at middle position (MIDDLE);

FIGS. 21Ci, 21Cii, 21Ciii and 21Civ are diagrams illustrating various aberrations (spherical aberration, astigmatism, distortion, and lateral chromatic aberration, respectively) of the zoom lens for projection in Example 7 at telephoto end (TELE);

DESCRIPTION OF THE PREFERRED EMBODIMENTS

Figure 1:
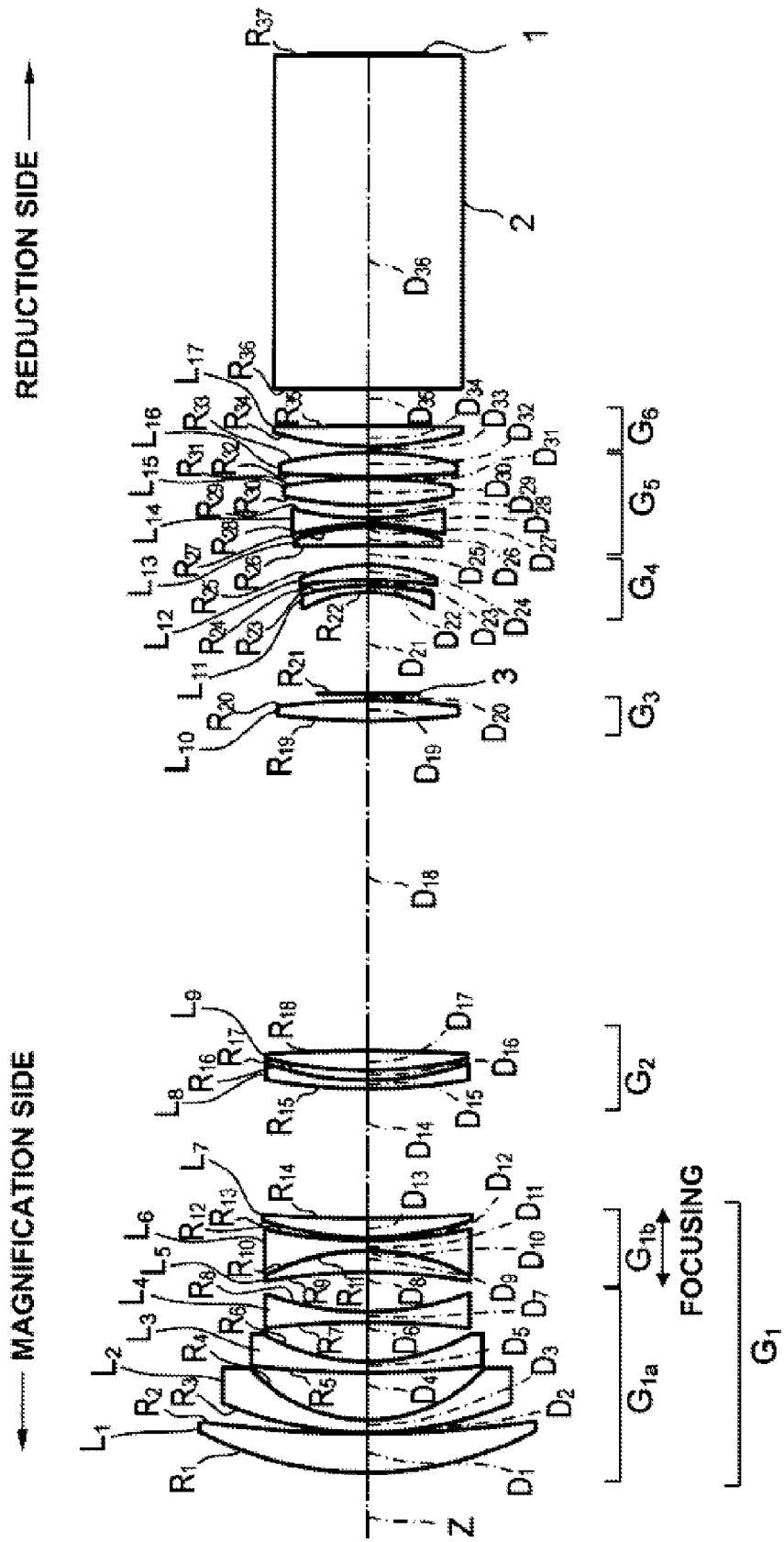
FIG. 1 is a diagram illustrating the structure of a zoom lens for projection in Example 1.
Figure 2:
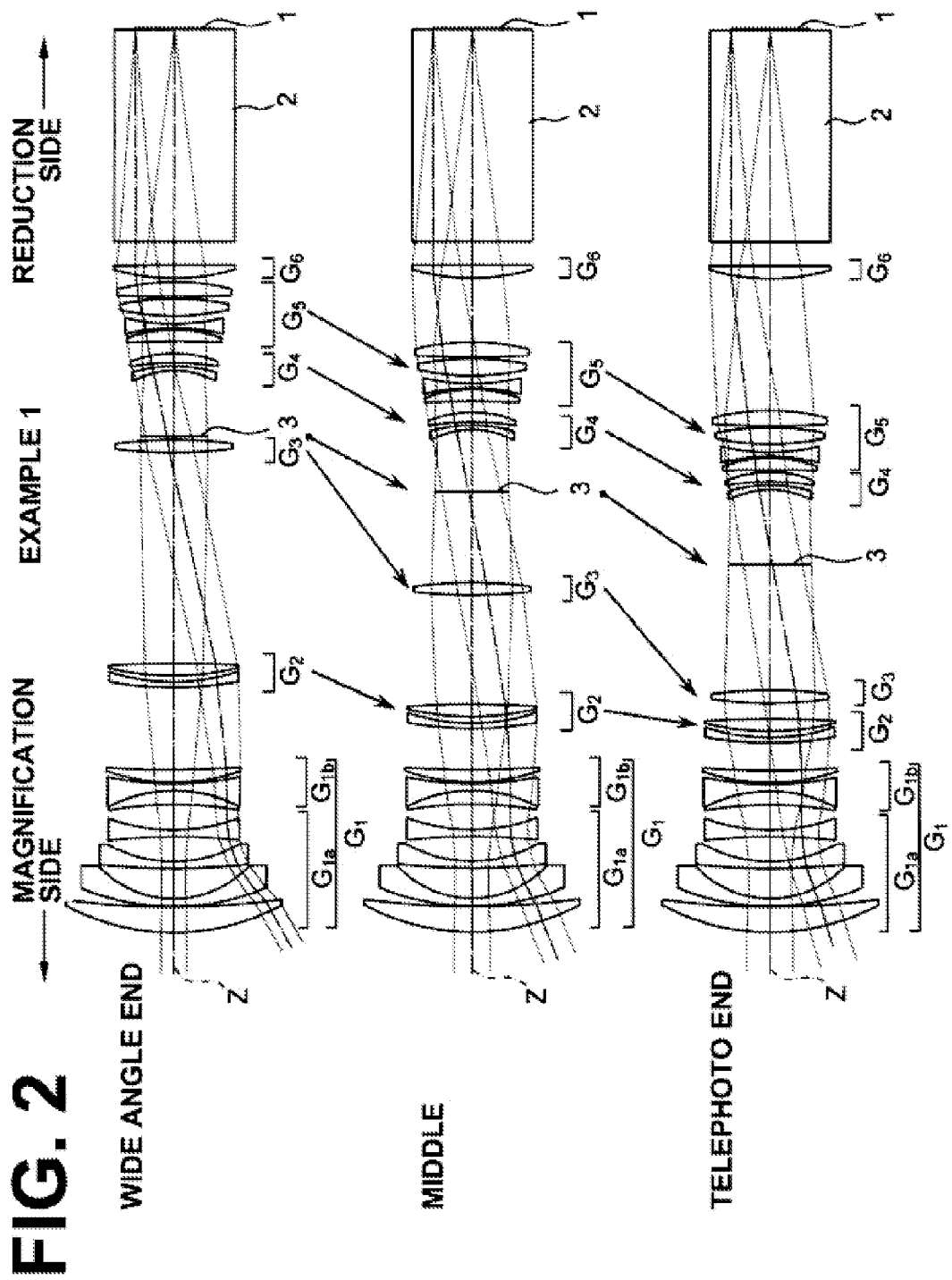
FIG. 2 is a diagram illustrating movement positions of lens groups in the zoom lens for projection of Example 1 at wide angle end (WIDE), at middle position (MIDDLE) and at telephoto end (TELE)

Hereinafter, embodiments of the present invention will be described with reference to drawings. FIG. 1 is a diagram illustrating the structure of a zoom lens for projection in Example 1 of the present invention at wide angle end. FIG. 2 is a diagram illustrating movement paths of lens groups in the zoom lens for projection of Example 1 while magnification is changed. Embodiments of the present invention will be described by using this zoom lens as an example representing the present invention.

This zoom lens for projection is mountable on a projection-type display apparatus for projecting digital video images at a movie theater or the like. The zoom lens for projection is composed of a magnification-side lens group (first lens group $G_1$ in this example), a plurality of lens groups (second lens group $G_2$ having positive refractive power, third lens group $G_3$ having positive refractive power, fourth lens group $G_4$ having positive refractive power, and fifth lens group $G_5$ having positive refractive power, which are arranged in this order from the magnification side, in this example (the fourth lens group $G_4$ has negative refractive power in Examples 4 and 5, which will be described later)), and a reduction-side lens group (sixth lens group $G_6$ in this example), which are arranged in this order from the magnification side of the zoom lens for projection. The magnification-side lens group has negative refractive power, and is fixed while magnification is changed. The plurality of lens groups move, in correlation with each other, to change the magnification of the zoom lens for projection in a continuous manner and to correct a shift of an image plane caused by the continuous change of magnification. Further, the reduction-side lens group has positive refractive power, and is fixed while magnification is changed.

As illustrated in FIGS. 1 and 2, the magnification-side lens group (first lens group $G_1$ in this example) is composed of a front group (front group $G_{1a}$ in this example) having negative refractive power and a rear group (rear group $G_{1b}$ in this example) having positive refractive power, which are arranged in this order from the magnification side. Further, the rear group is composed of a positive lens (fifth lens $L_5$ in this example), a negative lens (sixth lens $L_6$ in this example) and a positive lens (seventh lens $L_7$ in this example), which are arranged in this order from the magnification side. Focusing is performed by moving the rear group along optical axis Z.

Only the rear group in the magnification-side lens group is moved to perform a focusing operation, and the rear group is composed of three lenses of a positive lens, a negative lens and a positive lens. Therefore, it is possible to reduce the weight of the lenses that are moved for focusing. Hence, it is possible to reduce the load on a mechanism for a focusing operation. Further, it is possible to simplify the lens movement mechanism, compared with the case in which the group that is moved while magnification is changed is moved also in focusing.

In this example, first-group front group $G_{1a}$ is composed of four lenses $L_1$ through $L_4$. Second lens group $G_2$ is composed of two lenses $L_8$, $L_9$. Third lens group $G_3$ is composed of lens $L_{10}$. Fourth lens group $G_4$ is composed of two lenses $L_{11}$, $L_{12}$. Fifth lens group $G_5$ is composed of four lenses $L_{13}$ through $L_{16}$. Sixth lens group $G_6$ is composed of lens $L_{17}$.

In this example, an aperture stop 3, which is an actual stop, is arranged between the third lens group $G_3$ and the fourth lens group $G_4$. When magnification is changed, the aperture stop 3 moves independently from the lens groups of the zoom lens for projection in such a manner that F-number Fno is substantially constant through the entire range of magnification.

The aperture stop 3 moves while magnification is changed, and the F-number (Fno) of the lens system is constant, regardless of the zooming position.

Accordingly, when the zoom lens for projection of the present invention is mounted on a projection-type display apparatus for showing movies at a movie theater or the like, even if a projection distance needs to be changed at each movie theater to project images in the same screen size, it is possible to project, at a similar intensity of light, excellent-quality video images that can satisfy an audience onto a large screen, regardless of the projection distance if the screen size in projection is the same. Such video images are projectable by performing an operation for changing magnification by moving the plurality of lens groups (second lens group $G_2$, third lens group $G_3$, fourth lens group $G_4$, and fifth lens group $G_5$ in this example) in the direction of the optical axis, and also by performing a focusing operation by moving the rear group in the magnification-side lens group in the direction of the optical axis.

Further, the zoom lens for projection is structured in such a manner that average value $N_{dRpAVE}$ of the refractive indices of the positive lenses in the rear group of the magnification-side lens group with respect to d-line satisfies the following formula (1):

$$1.73 < N_{dRpAVE} \qquad (1).$$

Further, the zoom lens for projection is structured in such a manner that Abbe number $v_{dRn}$ of the negative lens in the rear group of the magnification-side lens group with respect to d-line satisfies the following formula (2):

$$60 < v_{dRn} \qquad (2).$$

As described above, in the zoom lens for projection of the present invention, average value $N_{dRpAVE}$ of the refractive indices of the positive lenses in the rear group of the magnification-side lens group with respect to d-line satisfies the formula (1). Therefore, it is possible to make the amount of movement of the rear group small during focusing. Hence, a change in paths of rays passing through the first lens group is small, and it is possible to suppress a fluctuation of curvature of field. Further, Abbe number $v_{dRn}$ of the negative lens in the rear group of the magnification-side lens group with respect to d-line satisfies the formula (2). Therefore, it is possible to suppress a fluctuation of longitudinal chromatic aberrations. Hence, it is possible to suppress a fluctuation of longitudinal chromatic aberrations and a fluctuation of curvature of field during a focusing operation in an excellent manner.

Therefore, it is desirable that the following formula (1') is satisfied instead of the formula (1):

$$1.74 < N_{dRpAVE} < 1.81 \qquad (1').$$

When the lower limit of the formula (1') is satisfied, it is possible to achieve higher advantageous effects than the effects achievable by satisfying the formula (1). When the upper limit of the formula (1') is satisfied, it is possible to prevent use of a material that is generally expensive and that does not have very excellent transmittance.

Further, it is desirable that the following formula (2') is satisfied instead of the formula (2):

$$60 < v_{dRn} < 75 \qquad (2').$$

When the lower limit of the formula (2') is satisfied, it is possible to achieve advantageous effects similar to the effects achievable by satisfying the formula (2). When the upper limit of the formula (2') is satisfied, it is possible to prevent use of a material that is generally expensive.

Further, when the negative lens of the three lenses in the rear group is a double-concave lens and the absolute value of the radius of curvature of the magnification-side surface of the negative lens is smaller than the absolute value of the radius of curvature of the reduction-side surface of the negative lens, it is possible to correct a fluctuation of curvature of field caused by a focusing operation in a more excellent manner.

Further, when the plurality of lens groups that move in an operation for changing magnification are second lens group $G_2$, third lens group $G_3$, fourth lens group $G_4$, and fifth lens group $G_5$, as described above, and the powers of these lens groups are positive, positive, one of positive and negative, and positive in this order from the magnification side, it is possible to make the outer diameter of the lens or lenses of the lens system and the entire length of the lens system within allowable values, while maintaining desirable lens performance in an excellent manner.

Further, the reduction-side lens group (sixth lens group $G_6$ in this example) is a relay lens that is fixed while magnification is changed. Further, a color combination prism (including a low-pass filter, an infrared-ray cut filter, or the like) 2 is arranged between the reduction-side lens group and a display surface 1 of a light valve, such as a liquid crystal display panel.

As described above, in the present embodiment, no cemented lens is provided in any of the lens groups that move while magnification is changed and in the reduction-side lens group, which is fixed while magnification is changed. No cemented lens is used, because unlike a projection apparatus for home or small meeting use, the apparatus of the present embodiment uses a xenon lamp or the like, as a light source, which outputs light of extremely high intensity that is higher than or equal to 2 kW. Therefore, if a cemented lens is provided, there is a risk that the high intensity light changes and damages the quality of an adhesive for cementing lenses extremely. Hence, no cemented lens is provided in the aforementioned lens groups to prevent a deterioration in the lens performance.

Further, it is desirable that the zoom lens for projection satisfies at least one of the following formulas (3) through (8):

$$-2.5 < f_1/f < -1.5 \qquad (3);$$

$$4.0 < f_2/f < 7.0 \qquad (4);$$

$$5.0 < f_3/f < 8.0 \qquad (5);$$

$$6.0 < f_{4-5}/f < 9.0 \qquad (6);$$

$$60 < v_{dG3} \qquad (7);$$

and $$2.0 < Bf/f \qquad (8),$$

where f is the focal length of the entire system at wide angle end when projection distance is at infinity, $f_1$ is the focal length of the first lens group $G_1$ (the magnification-side lens group) when projection distance is at infinity, $f_2$ is the focal length of the second lens group $G_2$ (a most-magnification-side lens group of the plurality of lens groups), $f_3$ is the focal length of the third lens group $G_3$ (a lens group located at a second position from the magnification side of the plurality of lens groups), $f_{4-5}$ is the combined focal length of the fourth lens group $G_4$ and the fifth lens group $G_5$ (a lens group located at a third position from the magnification side of the plurality of lens groups and a lens group located at a fourth position from the magnification side of the plurality of lens groups) at wide angle end, $v_{dG3}$ is the Abbe number of the third lens group $G_3$ (the lens group located at the second position from the magnification side of the plurality of lens groups) with respect to d-line, and Bf is back focus (in air) on the reduction side of the entire system at wide angle end.

With respect to the formula (7), it is desirable that the formula (7) is satisfied when the third lens group $G_3$ (the lens group located at the second position from the magnification side of the plurality of lens groups) is composed of a lens.

Next, the technical meanings of the formulas (3) through (8) will be described.

As described above, the formula (3) regulates the power of the first lens group $G_1$ (magnification-side lens group). Specifically, when the formula (3) is satisfied, the power distributed to the first lens group $G_1$ (magnification-side lens group) is reduced. Therefore, it is possible to correct aberrations of the first lens group $G_1$ in an excellent manner, and to achieve wide angle.

When the value of $f_1/f$ exceeds the upper limit defined by the formula (3), excessive power is distributed to the first lens group $G_1$ (magnification-side lens group). Therefore, it becomes difficult to correct aberrations of the first lens group $G_1$ in an excellent manner. In contrast, when the value of $f_1/f$ is lower than the lower limit defined by the formula (3), it becomes difficult to achieve wide angle.

Therefore, it is desirable that the following formula (3') is satisfied instead of the formula (3):

$$-2.0 < f_1/f < -1.7 \qquad (3').$$

Further, as described above, the formula (4) regulates the power of the second lens group $G_2$ (the most-magnification-side lens group of the plurality of lens groups). Specifically, when the formula (4) is satisfied, it is possible to prevent the diameter of the magnification-side lens or lenses (diameter of a front lens or lenses) from becoming too large. Especially, it is possible to correct lateral chromatic aberration on the wide-angle-end side in an excellent manner.

When the value of $f_2/f$ exceeds the upper limit defined by the formula (4), the diameter of the magnification-side lens or lenses (diameter of a front lens or lenses) becomes too large. In contrast, when the value of $f_2/f$ is lower than the lower limit defined by the formula (4), it becomes difficult to correct especially lateral chromatic aberration on the wide-angle-end side in an excellent manner.

Therefore, it is desirable that the following formula (4') is satisfied instead of the formula (4):

$$4.5 < f_2/f < 6.0 \qquad (4').$$

Further, as described above, the formula (5) regulates the power of the third lens group $G_3$ (a lens group located at a second position from the magnification side of the plurality of lens groups). Specifically, when the formula (5) is satisfied, it is possible to correct aberrations, especially longitudinal chromatic aberrations, in an excellent manner.

When the value of $f_3/f$ exceeds the upper limit defined by the formula (5), the powers of other lens groups become unbalanced to prevent the movement amount of the third lens group $G_3$ from excessively large while magnification is changed. Consequently, it becomes difficult to correct aberrations in an excellent manner. In contrast, when the value of $f_3/f$ is lower than the lower limit defined by the formula (5), it becomes difficult to correct aberrations, especially longitudinal chromatic aberrations, in an excellent manner.

Therefore, it is desirable that the following formula (5') is satisfied instead of the formula (5):

$$6.0 < f_3/f < 7.5 \qquad (5').$$

Further, as described above, the formula (6) regulates the combined power of the fourth lens group $G_4$ and the fifth lens group $G_5$ (a lens group located at a third position from the magnification side of the plurality of lens groups and a lens group located at a fourth position from the magnification side of the plurality of lens groups). Specifically, when the formula (6) is satisfied, it is possible to set desirable F-number by using the aperture stop 3, while excellent telecentricity of off-axial rays is maintained. Further, it is possible to correct aberrations in an excellent manner.

When the value of $f_{4-5}/f$ exceeds the upper limit defined by the formula (6), it becomes difficult to set desirable F-number by using the aperture stop 3, while excellent telecentricity of off-axial rays is maintained. In contrast, when the value of $f_{4-5}/f$ is lower than the lower limit defined by the formula (6), the diameter of the first lens group $G_1$ and the diameter of the second lens group $G_2$ become large. It is necessary to make the power of the first lens group $G_1$ and the power of the second lens group $G_2$ strong to suppress the increase in the diameter of the first lens group $G_1$, which is especially large. Consequently, it becomes difficult to correct aberrations in an excellent manner.

Therefore, it is desirable that the following formula (6') is satisfied instead of the formula (6):

$$6.3 < f_{4-5}/f < 8.0 \qquad (6').$$

Further, as described above, the formula (7) regulates the Abbe number of the lens constituting the third lens group $G_3$ (the lens group located at the second position from the magnification side of the plurality of lens groups) with respect to d-line when the third lens group $G_3$ is composed of one lens. Specifically, when the range defined by the formula (7) is satisfied, it is possible to easily obtain desirable power by using one lens, which is a minimum number of lens, to construct the third lens group $G_3$, while longitudinal chromatic aberration is corrected in an excellent manner.

Further, as described above, the formula (8) regulates the range of the back focus of the entire system. When the range defined by the formula (8) is satisfied, it is possible to easily insert a color combination prism 2 between a display surface 1 of the light valve and the zoom lens.

Therefore, it is desirable that the following formula (8') is satisfied instead of the formula (8):

$$2.2 < Bf/f < 4.0 \qquad (8').$$

When the lower limit of the formula (8') is satisfied, it is possible to achieve higher advantageous effects than the effects achievable by satisfying the formula (8). When the upper limit of the formula (8') is satisfied, it is possible to prevent the back focus from becoming longer than needed, and to prevent the entire system from becoming too long.

Further, in the zoom lens for projection, it is desirable that the fourth lens group $G_4$ (the lens group located at the third position from the magnification side of the plurality of lens groups) is composed of a positive lens and a negative lens. When the fourth lens group $G_4$ is constructed in such a manner, high variable magnification ratio is achievable while power that can maintain excellent telecentricity is kept. Further, it is possible to correct lateral chromatic aberrations in an excellent manner through the entire zoom range. Further, in the fifth lens group $G_5$ (the lens group located at the fourth position from the magnification side of the plurality of lens groups) of the zoom lens for projection, it is desirable that a positive lens, a negative lens, a positive lens, and a positive lens are arranged in this order from the magnification side. When the fifth lens group $G_5$ is constructed in such a manner, high variable magnification ratio is achievable while power that can maintain excellent telecentricity is kept. Further, it is possible to correct lateral chromatic aberrations in an excellent manner through the entire zoom range.

In the embodiments of the present invention, a so-called lens speed is regulated by the aperture stop 3, and the diameter of the aperture stop 3 is variable. Since such a variable stop is used, it is possible to easily make the value of Fno constant through the entire range of variable magnification when magnification is changed. It is not necessary that the zoom lens for projection of the present invention includes the variable stop. The zoom lens for projection of the present invention may include a stop in which the diameter of the aperture is variable, or a stop in which the diameter of the aperture is fixed.

Figure 22:
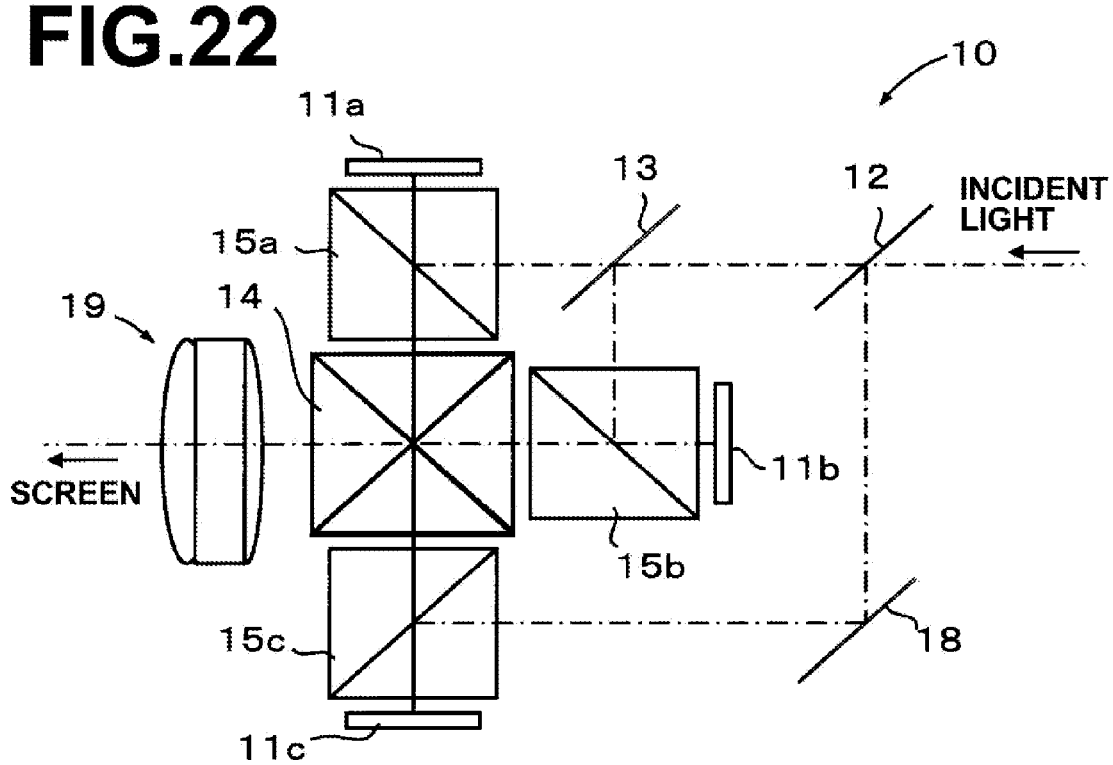
FIG. 22 is a schematic diagram illustrating a part of a projection-type display apparatus according to an embodiment of the present invention.

Further, the projection-type display apparatus according to an embodiment of the present invention includes a light source, a reflective liquid crystal display device, and a zoom lens for projection according to the aforementioned embodiment of the present invention. In the projection-type display apparatus, the zoom lens for projection according to the embodiment of the present invention functions as a projection lens for projecting an optical image of light that has been modulated by the reflective liquid crystal display device onto a screen. For example, as illustrated in FIG. 22, the projection-type display apparatus includes an illumination optical system 10. The illumination optical system 10 includes reflective liquid crystal display devices 11a through 11c corresponding to respective colors of light, dichroic mirrors 12, 13 for separating colors, a cross-dichroic prism 14 for combining colors, a total reflection mirror 18, and polarization light separation prisms 15a through 15c. A light source (not illustrated) is arranged before the dichroic mirror 12. White light output from the light source enters the reflective liquid crystal display devices (liquid crystal display panels) 11a through 11c corresponding to rays of light of three colors (G light, B light, and R light), respectively, and is optically modulated. Further, the modulated light is projected onto a screen (not illustrated) by a zoom lens 19 for projection according to an embodiment of the present invention.

Figure 23:
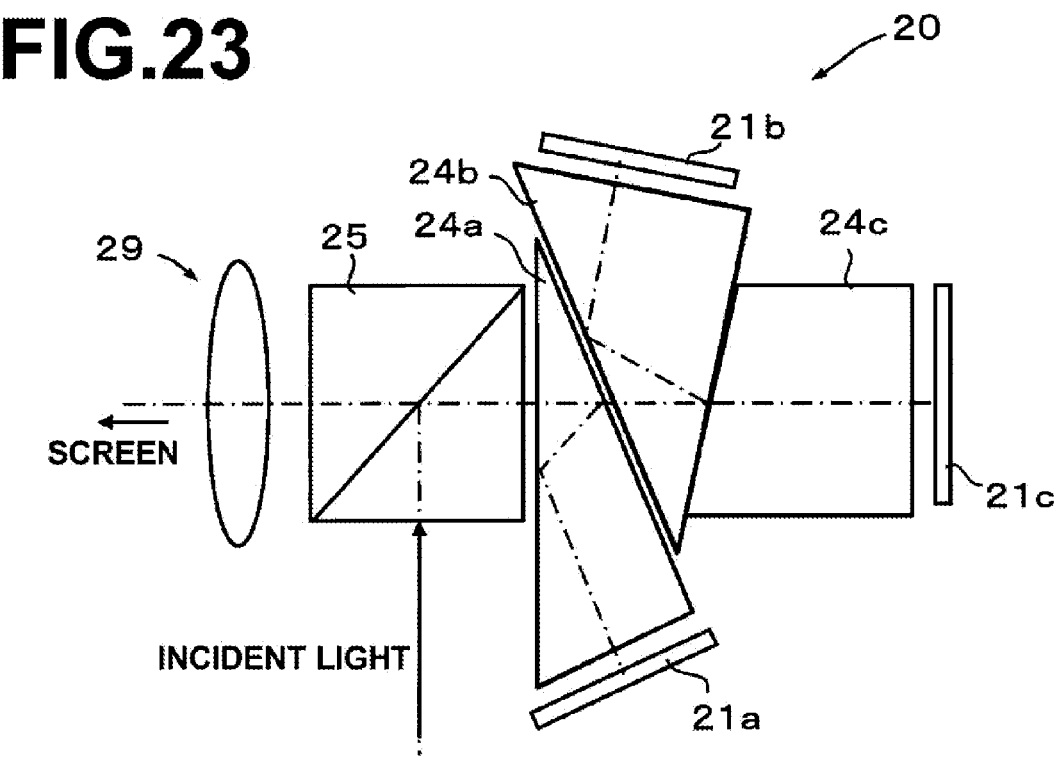
FIG. 23 is a schematic diagram illustrating a part of another example of a projection-type display apparatus according to an embodiment of the present invention.

A projection-type display apparatus according to another embodiment of the present invention is illustrated in FIG. 23. The projection-type display apparatus illustrated in FIG. 23 includes an illumination optical system 20. The illumination optical system 20 includes reflective liquid crystal display devices 21a through 21c, TIR (total internal reflection) prisms 24a through 24c for separating colors and combining colors, and a polarization separation prism 25. Steps before the polarization separation prism 25 are not illustrated in FIG. 23. White light output from a light source enters the reflective liquid crystal display devices (liquid crystal display panels) 21a through 21c corresponding to rays of light of three colors (G light, B light, and R light), respectively, and is optically modulated. Further, the modulated light is projected onto a screen (not illustrated) by a zoom lens 29 for projection according to an embodiment of the present invention.

The zoom lens for projection of the present invention may be modified in various manners. For example, the number of lenses constituting each lens group, the radius of curvature of each lens, and a distance between lenses (or a lens thickness) may be modified in an appropriate manner.

The zoom lens for projection of the present invention is most effectively usable, as a zoom lens for projection in a projection-type display apparatus using reflective liquid crystal display panels. However, it is not necessary that the zoom lens for projection of the present invention is used in such a projection-type display apparatus. Alternatively, the zoom lens for projection of the present invention may be used as a zoom lens for projection in an apparatus using a transmissive liquid crystal display panel, or in an apparatus using a different optical modulation means, such as a DMD.

EXAMPLES

Specific examples of the present invention will be described by using data.

Example 1

As illustrated in FIG. 1, a zoom lens for projection in Example 1 is composed of first lens group $G_1$ having negative refractive power, second lens group $G_2$ having positive refractive power, third lens group $G_3$ having positive refractive power, fourth lens group $G_4$ having positive refractive power, fifth lens group $G_5$ having positive refractive power, and sixth lens group $G_6$ having positive refractive power, which are arranged in this order from the magnification side of the zoom lens for projection. The second lens group $G_2$ through the fifth lens group $G_5$ move, in correlation with each other, to continuously change magnification and to correct a movement of an image plane caused by the continuous change in magnification. The sixth lens group $G_6$ is fixed while magnification is changed. Further, the first lens group $G_1$ is composed of front group $G_{1a}$ and rear group $G_{1b}$. A lens movement operation for focusing is performed by moving, on optical axis Z, only the rear group $G_{1b}$.

Specifically, in the zoom lens for projection of the present invention, the front group $G_{1a}$ of the first lens group $G_1$ is composed of first lens $L_1$, second lens $L_2$, third lens $L_3$, and fourth lens $L_4$, which are arranged in this order from the magnification side of the zoom lens for projection. The first lens $L_1$ is a positive meniscus lens having a convex surface facing the magnification side. The second lens $L_2$ is a negative meniscus lens having a convex surface facing the magnification side. The third lens $L_3$ is a negative meniscus lens having a convex surface facing the magnification side, and the fourth lens $L_4$ is a double-concave lens. Further, the rear group $G_{1b}$ of the first lens group $G_1$ is composed of fifth lens $L_5$, sixth lens $L_6$, and seventh lens $L_7$, which are arranged in this order from the magnification side of the zoom lens for projection. The fifth lens $L_5$ is a positive meniscus lens having a convex surface facing the reduction side, and the sixth lens $L_6$ is a double-concave lens. The seventh lens $L_7$ is a positive meniscus lens having a convex surface facing the magnification side.

Further, the second lens group $G_2$ is composed of eighth lens $L_8$ and ninth lens $L_9$, which are arranged in this order from the magnification side of the zoom lens for projection. The eighth lens $L_8$ is a negative meniscus lens having a convex surface facing the magnification side, and the ninth lens $L_9$ is a double-convex lens. Further, the third lens group $G_3$ consists of tenth lens $L_{10}$. In other words, the third lens group $G_3$ is composed of only tenth lens $L_{10}$. The tenth lens $L_{10}$ is a double-convex lens.

Further, the fourth lens group $G_4$ is composed of eleventh lens $L_{11}$ and twelfth lens $L_{12}$, which are arranged in this order from the magnification side of the zoom lens for projection. The eleventh lens $L_{11}$ is a negative meniscus lens having a convex surface facing the reduction side. The twelfth lens $L_{12}$ is a positive meniscus lens having a convex surface facing the reduction side.

Further, the fifth lens group $G_5$ is composed of thirteenth lens $L_{13}$, fourteenth lens $L_{14}$, fifteenth lens $L_{15}$, and sixteenth lens $L_{16}$, which are arranged in this order from the magnification side of the zoom lens for projection. The thirteenth lens $L_{13}$ is a positive meniscus lens having a convex surface facing the reduction side. The fourteenth lens $L_{14}$ is a double-concave lens, and the fifteenth lens $L_{15}$ is a double-convex lens. The sixteenth lens $L_{16}$ is a double-convex lens. Further, the sixth lens group $G_6$ is composed of seventeenth lens $L_{17}$, which is a double-convex lens.

Further, an aperture stop (variable stop) 3 is arranged between the third lens group $G_3$ and the fourth lens group $G_4$. The aperture stop 3 moves independently from the lens groups of the zoom lens for projection while magnification is changed.

FIG. 2 is a diagram illustrating movement positions of lens groups in the zoom lens for projection of Example 1 at wide angle end (WIDE), at middle position (MIDDLE) and at telephoto end (TELE). FIG. 2 illustrates the positions of the lens groups that move based on an operation for changing magnification.

Further, Table 1 shows radius R of curvature of each lens surface in Example 1 (normalized by assuming that the focal length at wide angle end is 1.00 when a magnification-side conjugate point is positioned at infinity; same in the other tables). Further, Table 1 shows center thickness D of each lens and air space D between lenses (in Table 1, both of the center thickness and the air space are collectively referred to as center thickness D, and normalized by assuming the focal length in a manner similar to the radius R of curvature; same in the other tables). Further, Table 1 shows refractive index $N_d$ and Abbe number $\nu_d$ of each lens with respect to d-line. In Table 1, and in Tables 2 through 7, which will be described later, numbers in the column of surface numbers sequentially increase from the magnification side of the zoom lens for projection.

Further, the top of Table 1 shows focal length f, F-number Fno., and full angle 2ω of view.

Further, the lower section of Table 1 shows variable distances at wide angle end (WIDE: zoom ratio is 1.00), at middle position (MIDDLE: zoom ratio is 1.40), and at telephoto end (TELE: zoom ratio is 1.80). Specifically, Table 1 shows distance $D_8$ (VARIABLE 1) between front group $G_{1a}$ of the first lens group and rear group $G_{1b}$ of the first lens group, distance $D_{14}$ (VARIABLE 2) between rear group $G_{1b}$ of the first lens group and second lens group $G_2$, distance $D_{18}$ (VARIABLE 3) between second lens group $G_2$ and third lens group $G_3$, distance $D_{20}$ (VARIABLE 4) between third lens group $G_3$ and the aperture stop 3, distance $D_{21}$ (VARIABLE 5) between the aperture stop 3 and fourth lens group $G_4$, distance $D_{25}$ (VARIABLE 6) between fourth lens group $G_4$ and fifth lens group $G_5$, and distance $D_{33}$ (VARIABLE 7) between fifth lens group $G_5$ and sixth lens group $G_6$. Further, Table 1 shows the diameter of the aperture stop (variable stop) 3.

TABLE 1

$f = 1.00\sim1.80$, Fno = 2.8, 2 ω = 57.4°~33.8°

| SURFACE NUMBER | CURVATURE OF RADIUS R | CENTER THICKNESS D | $N_d$ | $\nu_d$ |
|---|---|---|---|---|
| 1 | 3.0979 | 0.3597 | 1.713000 | 53.9 |
| 2 | 10.4455 | 0.0085 | | |
| 3 | 3.2464 | 0.1108 | 1.497000 | 81.6 |
| 4 | 1.4010 | 0.4255 | | |
| 5 | 9.4766 | 0.0959 | 1.808090 | 22.8 |
| 6 | 1.8315 | 0.3516 | | |
| 7 | −7.8759 | 0.0938 | 1.618000 | 63.3 |
| 8 | 2.5344 | (VARIABLE 1) | | |
| 9 | −4.9955 | 0.1918 | 1.829814 | 33.4 |
| 10 | −1.9311 | 0.0044 | | |
| 11 | −1.8991 | 0.0896 | 1.483356 | 65.6 |
| 12 | 4.1053 | 0.0268 | | |
| 13 | 2.8154 | 0.1728 | 1.743534 | 51.7 |
| 14 | 12.7307 | (VARIABLE 2) | | |
| 15 | 4.9099 | 0.0746 | 1.480012 | 65.6 |
| 16 | 2.7724 | 0.0904 | | |
| 17 | 3.7713 | 0.1747 | 1.771049 | 39.6 |
| 18 | −13.6544 | (VARIABLE 3) | | |
| 19 | 6.2570 | 0.1827 | 1.438750 | 94.9 |
| 20 | −5.9150 | (VARIABLE 4) | | |
| 21 | ∞ (STOP) | (VARIABLE 5) | | |
| 22 | −1.1861 | 0.0623 | 1.711731 | 34.4 |
| 23 | −2.0001 | 0.0470 | | |
| 24 | −3.8378 | 0.1351 | 1.652142 | 57.8 |
| 25 | −1.5987 | (VARIABLE 6) | | |
| 26 | −17.8179 | 0.1675 | 1.497000 | 81.6 |
| 27 | −1.8847 | 0.0276 | | |
| 28 | −2.4206 | 0.0538 | 1.804000 | 46.6 |
| 29 | 2.8511 | 0.1169 | | |
| 30 | 3.3953 | 0.2392 | 1.438750 | 94.9 |
| 31 | −3.9992 | 0.0194 | | |
| 32 | 11.4027 | 0.2180 | 1.497000 | 81.6 |
| 33 | −3.0541 | (VARIABLE 7) | | |
| 34 | 2.8720 | 0.1841 | 1.585166 | 61.4 |
| 35 | −596.5222 | 0.3388 | | |
| 36 | ∞ | 3.0000 | 1.516330 | 64.1 |
| 37 | ∞ | | | |

VARIABLE DISTANCE IN THE COLUMN "CENTER THICKNESS D" AND DIAMETER OF STOP

| ZOOM RATIO | VARIABLE 1 | VARIABLE 2 | VARIABLE 3 | VARIABLE 4 |
|---|---|---|---|---|
| 1.00 | 0.3485 | 1.1789 | 2.9727 | 0.0550 |
| 1.40 | 0.3485 | 0.5931 | 1.5333 | 1.2868 |
| 1.80 | 0.3485 | 0.3974 | 0.2222 | 1.7742 |

| ZOOM RATIO | VARIABLE 5 | VARIABLE 6 | VARIABLE 7 | DIAMETER OF STOP |
|---|---|---|---|---|
| 1.00 | 0.9249 | 0.1757 | 0.0511 | 0.572 |
| 1.40 | 0.8800 | 0.1547 | 0.9105 | 0.512 |
| 1.80 | 1.0600 | 0.0341 | 1.8706 | 0.464 |

Further, Table 8 shows numerical values corresponding to formulas (1) through (8) with respect to Example 1.

FIGS. 15Ai, 15Aii, 15Aiii and 15Aiv are diagrams illustrating various aberrations (spherical aberration, astigmatism, distortion, and lateral chromatic aberration, respectively) of the zoom lens for projection in Example 1 at wide angle end (WIDE). FIGS. 15Bi, 15Bii, 15Biii and 15Biv are diagrams illustrating various aberrations (spherical aberration, astigmatism, distortion, and lateral chromatic aberration, respectively) of the zoom lens for projection in Example 1 at middle position (MIDDLE). FIGS. 15Ci, 15Cii, 15Ciii and 15Civ are diagrams illustrating various aberrations (spherical aberration, astigmatism, distortion, and lateral chromatic aberration, respectively) of the zoom lens for projection in Example 1 at telephoto end (TELE). Diagrams illustrating aberrations in other examples are illustrated in a similar manner. In FIGS. 15Ai through 15Civ, and in FIGS. 16Ai through 16Civ, 17Ai through 17Civ, 18Ai through 18Civ, 19Ai through 19Civ, 20Ai through 20Civ, and 21Ai through 21Civ, which will be described later, diagrams illustrating spherical aberrations include spherical aberrations with respect to d-line, F-line and C-line. Further, diagrams illustrating astigmatism illustrate aberrations with respect to a sagittal image plane and a tangential image plane. Further, diagrams illustrating lateral chromatic aberrations illustrate aberrations of F-line and C-line with respect to d-line.

As FIGS. 15Ai, 15Bi and 15Ci illustrating spherical aberrations indicate, F-number Fno is constant at 2.80 at wide angle end (WIDE), at middle position (MIDDLE), and at telephoto end (TELE).

As FIGS. 15Ai through 15Civ and Table 1 clearly indicate, the zoom lens for projection in Example 1 can correct aberrations in an excellent manner through the entire range of zooming. Further, appropriate back focus and excellent telecentricity on the reduction side are obtainable. Further, a small F-number (fast lens), compactness (small size), a wide angle of view, and a large zoom ratio are achievable in an excellently balanced manner. Especially, it is possible to make the F-number constant through the entire range of variable magnification.

Further, focusing is performed by moving rear group $G_{1b}$ of the first lens group, and the rear group $G_{1b}$ is composed of three lenses. Therefore, it is possible to reduce the load on a mechanism for a focusing operation.

Further, the zoom ratio is set at 1.80, which is large. Therefore, the zoom lens for projection can cope with a wide range of projection distance.

Example 2

Figure 3:
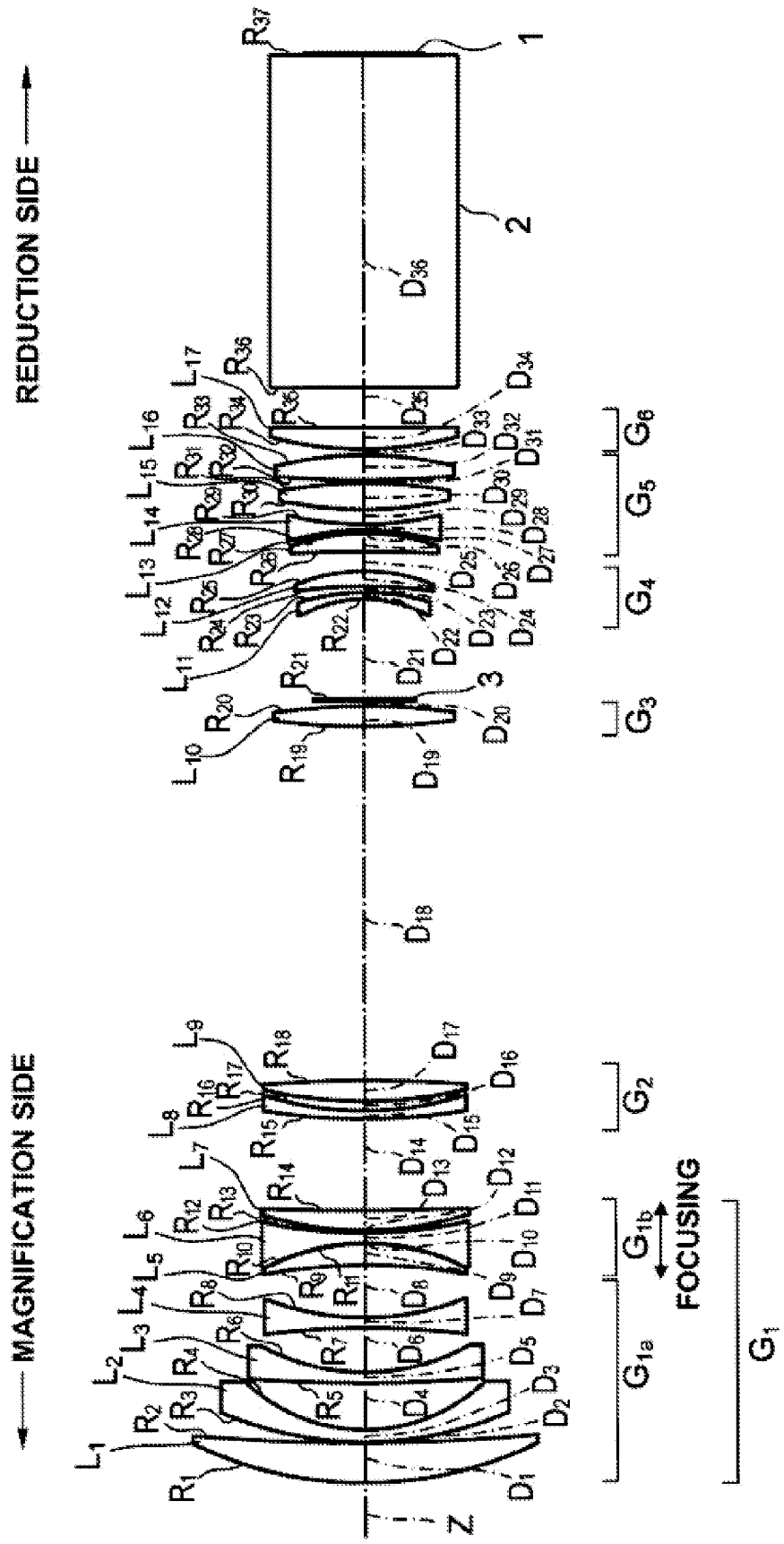
FIG. 3 is a diagram illustrating the structure of a zoom lens for projection in Example 2.

A zoom lens for projection in Example 2 is structured as illustrated in FIG. 3. The structure of the zoom lens for projection in Example 2 is basically similar to that of the zoom lens for projection in Example 1.

Figure 4:
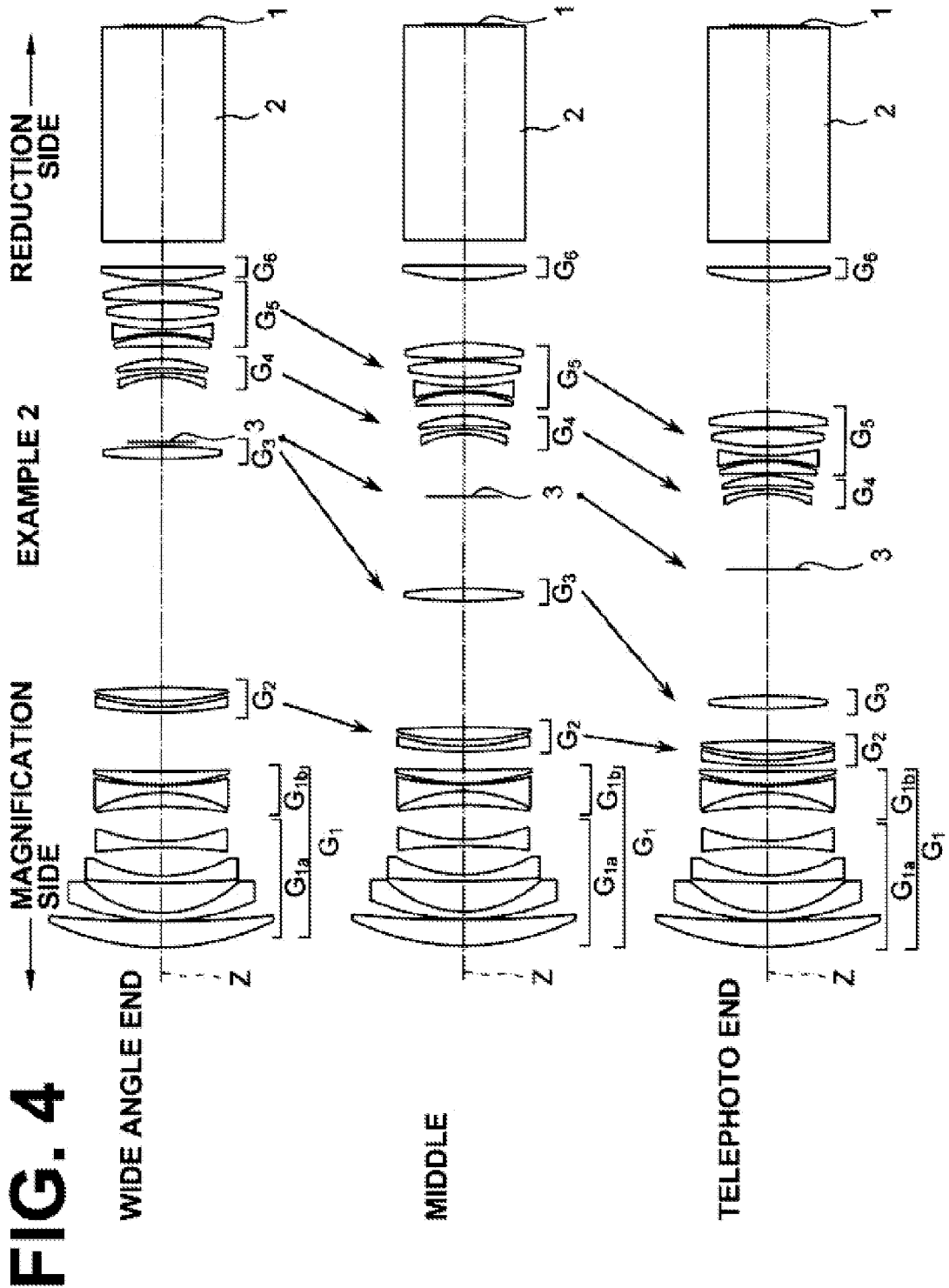
FIG. 4 is a diagram illustrating movement positions of lens groups in the zoom lens for projection of Example 2 at wide angle end (WIDE), at middle position (MIDDLE) and at telephoto end (TELE)

FIG. 4 is a diagram illustrating movement positions of lens groups in the zoom lens for projection of Example 2 at wide angle end (WIDE), at middle position (MIDDLE) and at telephoto end (TELE). FIG. 4 illustrates the positions of the lens groups that move based on an operation for changing magnification.

Table 2 shows radius R of curvature of each lens surface, center thickness D of each lens and air space D between lenses in Example 2. Further, Table 2 shows refractive index $N_d$ and Abbe number $v_d$ of each lens with respect to d-line.

Further, the top of Table 2 shows focal length f, F-number Fno., and full angle 2ω of view.

Further, the lower section of Table 2 shows variable distances at wide angle end (WIDE: zoom ratio is 1.00), at middle position (MIDDLE: zoom ratio is 1.40), and at telephoto end (TELE: zoom ratio is 1.80). Specifically, Table 2 shows distance $D_8$ (VARIABLE 1) between front group $G_{1a}$ of the first lens group and rear group $G_{1b}$ of the first lens group, distance $D_{14}$ (VARIABLE 2) between rear group $G_{1b}$ of the first lens group and second lens group $G_2$, distance $D_{18}$ (VARIABLE 3) between second lens group $G_2$ and third lens group $G_3$, distance $D_{20}$ (VARIABLE 4) between third lens group $G_3$ and the aperture stop 3, distance $D_{21}$ (VARIABLE 5) between the aperture stop 3 and fourth lens group $G_4$, distance $D_{25}$ (VARIABLE 6) between fourth lens group $G_4$ and fifth lens group $G_5$, and distance $D_{33}$ (VARIABLE 7) between fifth lens group $G_5$ and sixth lens group $G_6$. Further, Table 2 shows the diameter of the aperture stop (variable stop) 3.

TABLE 2

| | f = 1.00~1.80, Fno = 2.8, 2 ω = 57.4°~33.6° | | | |
|---|---|---|---|---|
| SURFACE NUMBER | CURVATURE OF RADIUS R | CENTER THICKNESS D | $N_d$ | $v_d$ |
| 1 | 3.4301 | 0.3625 | 1.713000 | 53.9 |
| 2 | 15.6711 | 0.0085 | | |
| 3 | 3.1397 | 0.1108 | 1.497000 | 81.6 |
| 4 | 1.5155 | 0.4185 | | |
| 5 | 13.3186 | 0.0959 | 1.808090 | 22.8 |
| 6 | 1.8999 | 0.3965 | | |
| 7 | −7.1134 | 0.0937 | 1.618000 | 63.3 |
| 8 | 2.3527 | (VARIABLE 1) | | |
| 9 | −4.9059 | 0.1917 | 1.801000 | 35.0 |
| 10 | −1.9268 | 0.0044 | | |
| 11 | −1.8949 | 0.0896 | 1.487490 | 70.2 |
| 12 | 3.9722 | 0.0259 | | |
| 13 | 3.0321 | 0.1783 | 1.729160 | 54.7 |
| 14 | 25.1959 | (VARIABLE 2) | | |
| 15 | 5.2717 | 0.0746 | 1.480012 | 65.6 |
| 16 | 2.8608 | 0.0875 | | |
| 17 | 3.8337 | 0.1858 | 1.772253 | 38.1 |
| 18 | −12.1234 | (VARIABLE 3) | | |
| 19 | 5.9784 | 0.1827 | 1.438750 | 94.9 |
| 20 | −5.6882 | (VARIABLE 4) | | |
| 21 | ∞ (STOP) | (VARIABLE 5) | | |
| 22 | −1.1686 | 0.0626 | 1.707005 | 34.0 |

TABLE 2-continued

| | | | | |
|---|---|---|---|---|
| 23 | −1.9278 | 0.0540 | | |
| 24 | −4.2446 | 0.1381 | 1.648611 | 58.0 |
| 25 | −1.6130 | (VARIABLE 6) | | |
| 26 | −13.1394 | 0.1647 | 1.497000 | 81.6 |
| 27 | −1.8797 | 0.0291 | | |
| 28 | −2.3741 | 0.0537 | 1.804000 | 46.6 |
| 29 | 2.8444 | 0.1319 | | |
| 30 | 3.5115 | 0.2379 | 1.438750 | 94.9 |
| 31 | −4.0695 | 0.0211 | | |
| 32 | 7.6230 | 0.2325 | 1.497000 | 81.6 |
| 33 | −3.1181 | (VARIABLE 7) | | |
| 34 | 3.1510 | 0.1947 | 1.587712 | 61.3 |
| 35 | −601.6892 | 0.3593 | | |
| 36 | ∞ | 3.0000 | 1.516330 | 64.1 |
| 37 | ∞ | | | |

VARIABLE DISTANCE IN THE COLUMN "CENTER THICKNESS D" AND DIAMETER OF STOP

| ZOOM RATIO | VARIABLE 1 | VARIABLE 2 | VARIABLE 3 | VARIABLE 4 |
|---|---|---|---|---|
| 1.00 | 0.4649 | 0.8346 | 3.1953 | 0.0550 |
| 1.40 | 0.4649 | 0.2646 | 1.7525 | 1.2845 |
| 1.80 | 0.4649 | 0.0837 | 0.4488 | 1.7664 |

| ZOOM RATIO | VARIABLE 5 | VARIABLE 6 | VARIABLE 7 | DIAMETER OF STOP |
|---|---|---|---|---|
| 1.00 | 0.9108 | 0.1763 | 0.0534 | 0.575 |
| 1.40 | 0.8800 | 0.1569 | 0.8870 | 0.517 |
| 1.80 | 1.0600 | 0.0342 | 1.8324 | 0.469 |

Further, Table 8 shows numerical values corresponding to formulas (1) through (8) with respect to Example 2.

Further, FIGS. 16Ai, 16Aii, 16Aiii and 16Aiv are diagrams illustrating various aberrations (spherical aberration, astigmatism, distortion, and lateral chromatic aberration, respectively) of the zoom lens for projection in Example 2 at wide angle end (WIDE). FIGS. 16Bi, 16Bii, 16Biii and 16Biv are diagrams illustrating various aberrations (spherical aberration, astigmatism, distortion, and lateral chromatic aberration, respectively) of the zoom lens for projection in Example 2 at middle position (MIDDLE). FIGS. 16Ci, 16Cii, 16Ciii and 16Civ are diagrams illustrating various aberrations (spherical aberration, astigmatism, distortion, and lateral chromatic aberration, respectively) of the zoom lens for projection in Example 2 at telephoto end (TELE).

As FIGS. 16Ai, 16Bi and 16Ci illustrating spherical aberrations indicate, F-number Fno is constant at 2.80 at wide angle end (WIDE), at middle position (MIDDLE), and at telephoto end (TELE).

As FIGS. 16Ai through 16Civ and Table 2 clearly indicate, the zoom lens for projection in Example 2 can correct aberrations in an excellent manner through the entire range of zooming. Further, appropriate back focus and excellent telecentricity on the reduction side are obtainable. Further, a small F-number (fast lens), compactness, a wide angle of view, and a large zoom ratio are achievable in an excellently balanced manner. Especially, it is possible to make the F-number constant through the entire range of variable magnification.

Further, focusing is performed by moving rear group $G_{1b}$ of the first lens group, and the rear group $G_{1b}$ is composed of three lenses. Therefore, it is possible to reduce the load on a mechanism for a focusing operation.

Further, the zoom ratio is set at 1.80, which is large. Therefore, the zoom lens for projection can cope with a wide range of projection distance.

Example 3

Figure 5:
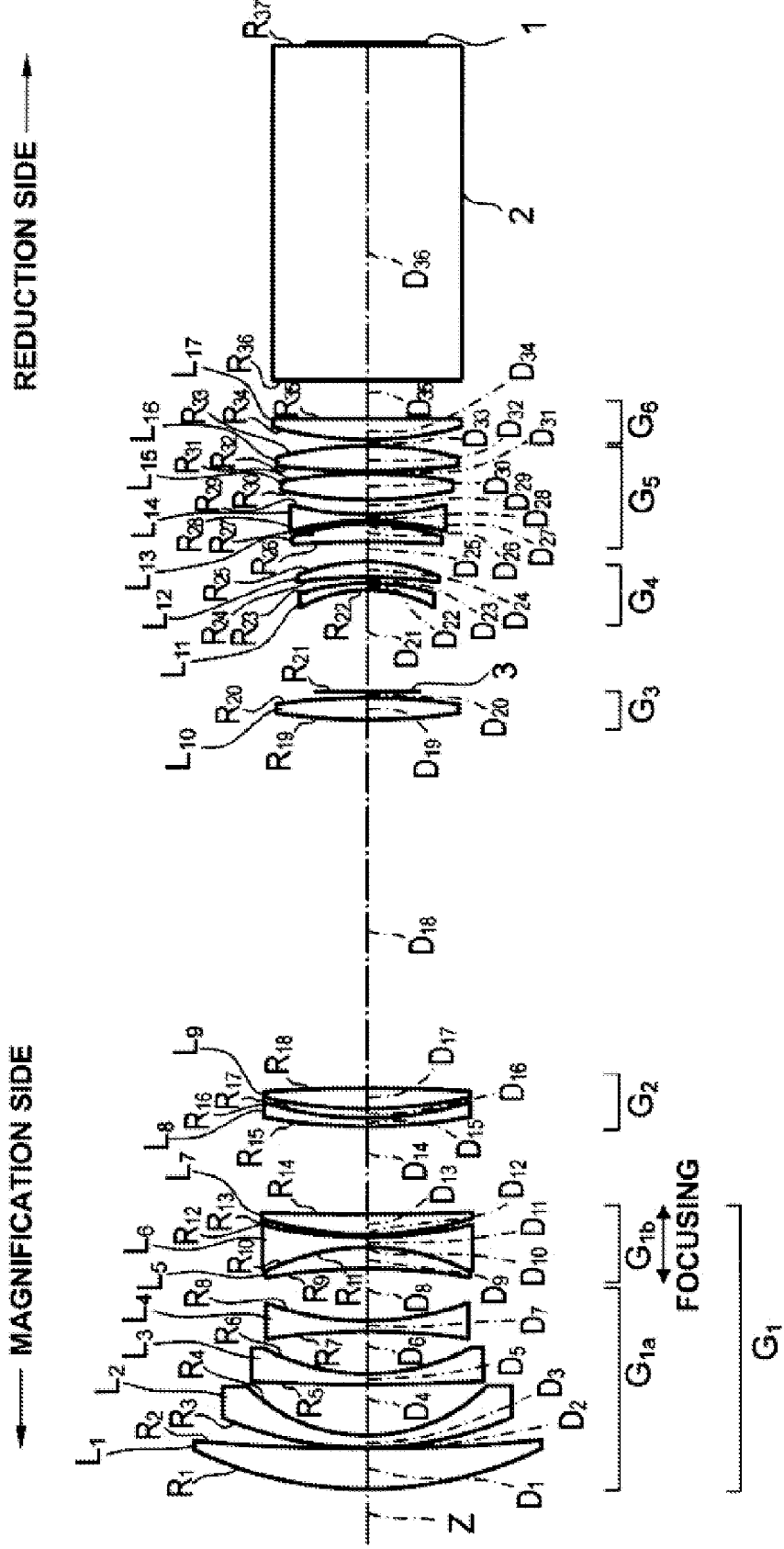
FIG. 5 is a diagram illustrating the structure of a zoom lens for projection in Example 3.

A zoom lens for projection in Example 3 is structured as illustrated in FIG. 5. The structure of the zoom lens for projection in Example 3 is substantially similar to that of the zoom lens for projection in Example 1. However, Example 3 differs from Example 1 in that fifth lens $L_5$ and six lens $L_6$ are cemented together to form a cemented lens (therefore, in Table 3, numbers in the column of surface numbers corresponding to the values in the columns of signs R, D are moved up one after the cemented lens, compared with Example 1).

Figure 6:
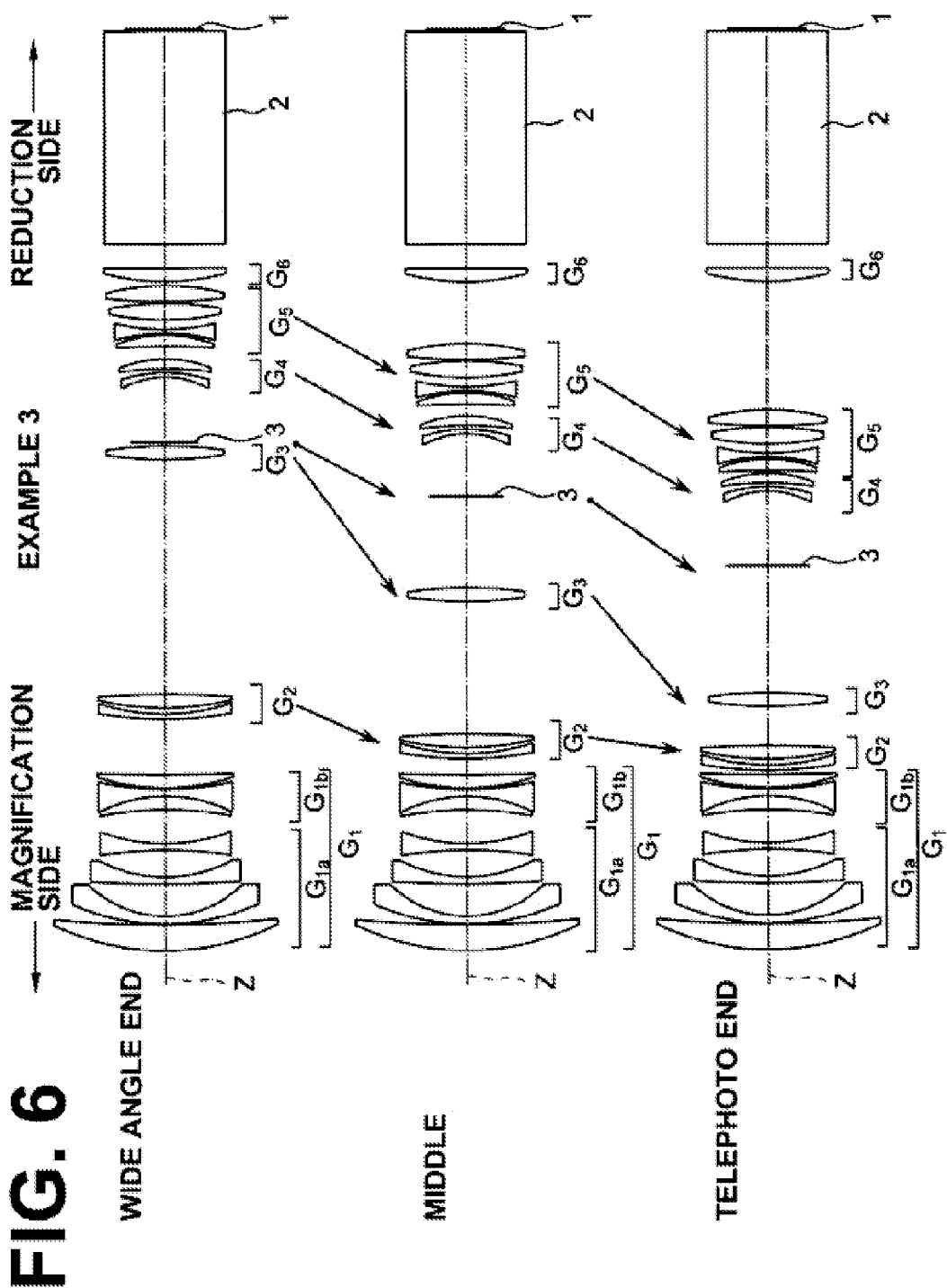
FIG. 6 is a diagram illustrating movement positions of lens groups in the zoom lens for projection of Example 3 at wide angle end (WIDE), at middle position (MIDDLE) and at telephoto end (TELE)

FIG. 6 is a diagram illustrating movement positions of lens groups in the zoom lens for projection of Example 3 at wide angle end (WIDE), at middle position (MIDDLE) and at telephoto end (TELE). FIG. 6 illustrates the positions of the lens groups that move based on an operation for changing magnification.

Further, Table 3 shows radius R of curvature of each lens surface, center thickness D of each lens and air space D between lenses in Example 3. Further, Table 3 shows refractive index $N_d$ and Abbe number $v_d$ of each lens with respect to d-line.

Further, the top of Table 3 shows focal length f, F-number Fno., and full angle 2ω of view.

Further, the lower section of Table 3 shows variable distances at wide angle end (WIDE: zoom ratio is 1.00), at middle position (MIDDLE: zoom ratio is 1.40), and at telephoto end (TELE: zoom ratio is 1.80). Specifically, Table 3 shows distance $D_8$ (VARIABLE 1) between front group $G_{1a}$ of the first lens group and rear group $G_{1b}$ of the first lens group, distance $D_{13}$ (VARIABLE 2) between rear group $G_{1b}$ of the first lens group and second lens group $G_2$, distance $D_{17}$ (VARIABLE 3) between second lens group $G_2$ and third lens group $G_3$, distance $D_{19}$ (VARIABLE 4) between third lens group $G_3$ and the aperture stop 3, distance $D_{20}$ (VARIABLE 5) between the aperture stop 3 and fourth lens group $G_4$, distance $D_{24}$ (VARIABLE 6) between fourth lens group $G_4$ and fifth lens group $G_5$, and distance $D_{32}$ (VARIABLE 7) between fifth lens group $G_5$ and sixth lens group $G_6$. Further, Table 3 shows the diameter of the aperture stop (variable stop) 3.

TABLE 3 f = 1.00~1.80, Fno = 2.8, 2 ω = 57.4°~33.6°

| SURFACE NUMBER | CURVATURE OF RADIUS R | CENTER THICKNESS D | $N_d$ | $v_d$ |
|---|---|---|---|---|
| 1 | 3.4469 | 0.3635 | 1.713000 | 53.9 |
| 2 | 15.4593 | 0.0085 | | |
| 3 | 3.0938 | 0.1108 | 1.497000 | 81.6 |
| 4 | 1.4768 | 0.4514 | | |
| 5 | 16.2810 | 0.0959 | 1.808090 | 22.8 |
| 6 | 1.9300 | 0.3777 | | |
| 7 | −5.8605 | 0.0938 | 1.618000 | 63.3 |
| 8 | 2.5036 | (VARIABLE 1) | | |
| 9 | −4.9587 | 0.1917 | 1.834000 | 37.2 |
| 10 | −1.9675 | 0.0896 | 1.487490 | 70.2 |
| 11 | 3.9248 | 0.0255 | | |
| 12 | 3.0634 | 0.1808 | 1.729160 | 54.7 |
| 13 | 25.5206 | (VARIABLE 2) | | |
| 14 | 5.0443 | 0.0746 | 1.480012 | 65.6 |
| 15 | 2.8892 | 0.0852 | | |
| 16 | 3.9083 | 0.1894 | 1.774118 | 37.0 |
| 17 | −12.2740 | (VARIABLE 3) | | |
| 18 | 5.6765 | 0.1930 | 1.438750 | 94.9 |
| 19 | −5.6459 | (VARIABLE 4) | | |
| 20 | ∞ (STOP) | (VARIABLE 5) | | |
| 21 | −1.1709 | 0.0626 | 1.705316 | 34.1 |
| 22 | −1.9111 | 0.0538 | | |
| 23 | −4.3054 | 0.1379 | 1.640808 | 58.4 |
| 24 | −1.6119 | (VARIABLE 6) | | |
| 25 | −12.0716 | 0.1627 | 1.497000 | 81.6 |
| 26 | −1.8688 | 0.0289 | | |
| 27 | −2.3593 | 0.0537 | 1.804000 | 46.6 |
| 28 | 2.8309 | 0.1319 | | |
| 29 | 3.5237 | 0.2338 | 1.438750 | 94.9 |
| 30 | −4.1960 | 0.0215 | | |
| 31 | 7.3622 | 0.2277 | 1.497000 | 81.6 |
| 32 | −3.1665 | (VARIABLE 7) | | |
| 33 | 3.0674 | 0.1898 | 1.585569 | 61.4 |
| 34 | −600.2826 | 0.3384 | | |
| 35 | ∞ | 3.0000 | 1.516330 | 64.1 |
| 36 | ∞ | | | |

VARIABLE DISTANCE IN THE COLUMN
"CENTER THICKNESS D" AND DIAMETER OF STOP

| ZOOM RATIO | VARIABLE 1 | VARIABLE 2 | VARIABLE 3 | VARIABLE 4 |
|---|---|---|---|---|
| 1.00 | 0.3485 | 1.1789 | 2.9727 | 0.0550 |
| 1.40 | 0.3485 | 0.5931 | 1.5333 | 1.2868 |
| 1.80 | 0.3485 | 0.3974 | 0.2222 | 1.7742 |

| ZOOM RATIO | VARIABLE 5 | VARIABLE 6 | VARIABLE 7 | DIAMETER OF STOP |
|---|---|---|---|---|
| 1.00 | 0.9249 | 0.1757 | 0.0511 | 0.572 |
| 1.40 | 0.8800 | 0.1547 | 0.9105 | 0.512 |
| 1.80 | 1.0600 | 0.0341 | 1.8706 | 0.464 |

Further, Table 8 shows numerical values corresponding to formulas (1) through (8) with respect to Example 3.

FIGS. 17Ai, 17Aii, 17Aiii and 17Aiv are diagrams illustrating various aberrations (spherical aberration, astigmatism, distortion, and lateral chromatic aberration, respectively) of the zoom lens for projection in Example 3 at wide angle end (WIDE). FIGS. 17Bi, 17Bii, 17Biii and 17Biv are diagrams illustrating various aberrations (spherical aberration, astigmatism, distortion, and lateral chromatic aberration, respectively) of the zoom lens for projection in Example 3 at middle position (MIDDLE). FIGS. 17Ci, 17Cii, 17Ciii and 17Civ are diagrams illustrating various aberrations (spherical aberration, astigmatism, distortion, and lateral chromatic aberration, respectively) of the zoom lens for projection in Example 3 at telephoto end (TELE).

As FIGS. 17Ai, 17Bi and 17Ci illustrating spherical aberrations indicate, F-number Fno is constant at 2.80 at wide angle end (WIDE), at middle position (MIDDLE), and at telephoto end (TELE).

As FIGS. 17Ai through 17Civ and Table 3 clearly indicate, the zoom lens for projection in Example 3 can correct aberrations in an excellent manner through the entire range of zooming. Further, appropriate back focus and excellent telecentricity on the reduction side are obtainable. Further, a small F-number (fast lens), compactness, a wide angle of view, and a large zoom ratio are achievable in an excellently balanced manner. Especially, it is possible to make the F-number constant through the entire range of variable magnification.

Further, focusing is performed by moving rear group $G_{1b}$ of the first lens group, and the rear group $G_{1b}$ is composed of three lenses. Therefore, it is possible to reduce the load on a mechanism for a focusing operation.

Further, the zoom ratio is set at 1.80, which is large. Therefore, the zoom lens for projection can cope with a wide range of projection distance.

Example 4

Figure 7:
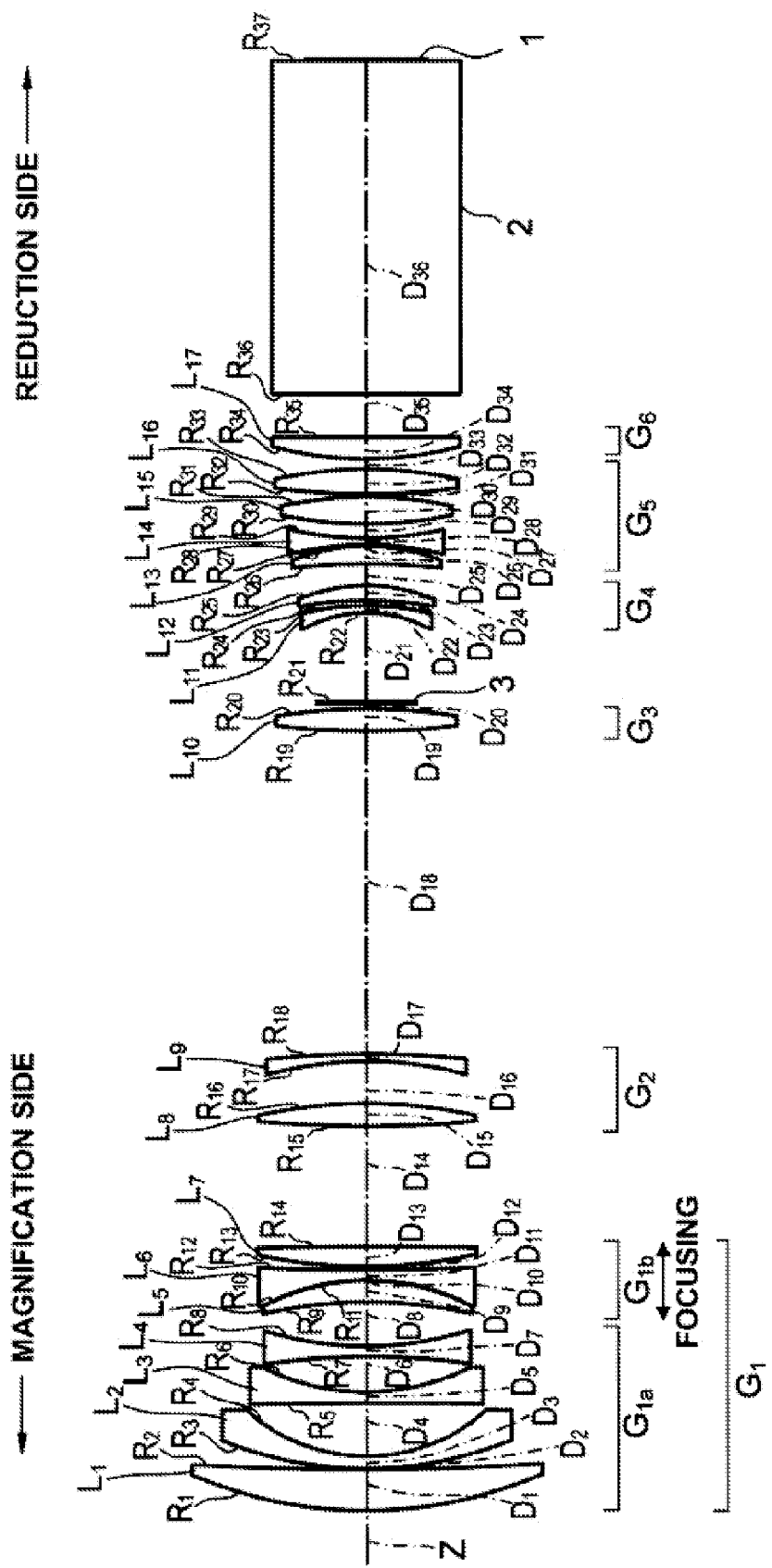
FIG. 7 is a diagram illustrating the structure of a zoom lens for projection in Example 4.

A zoom lens for projection in Example 4 is structured as illustrated in FIG. 7. The structure of the zoom lens for projection in Example 4 is substantially similar to that of the zoom lens for projection in Example 1. However, Example 4 differs from Example 1 in that third lens $L_3$ is a double-concave lens, and that seventh lens $L_7$ is a double-convex lens, and that eighth lens $L_8$ is a double-convex lens, and that ninth lens $L_9$ is a negative meniscus lens having a convex surface facing the reduction side, and that seventeenth lens $L_{17}$ is a plano-convex lens having a convex surface facing the magnification side. Further, the zoom lens for projection in Example 4 and the zoom lens for projection in Example 5, which will be described latter, differ from the zoom lenses for projection in the other examples in that fourth lens group $G_4$ has negative refractive power.

Figure 8:
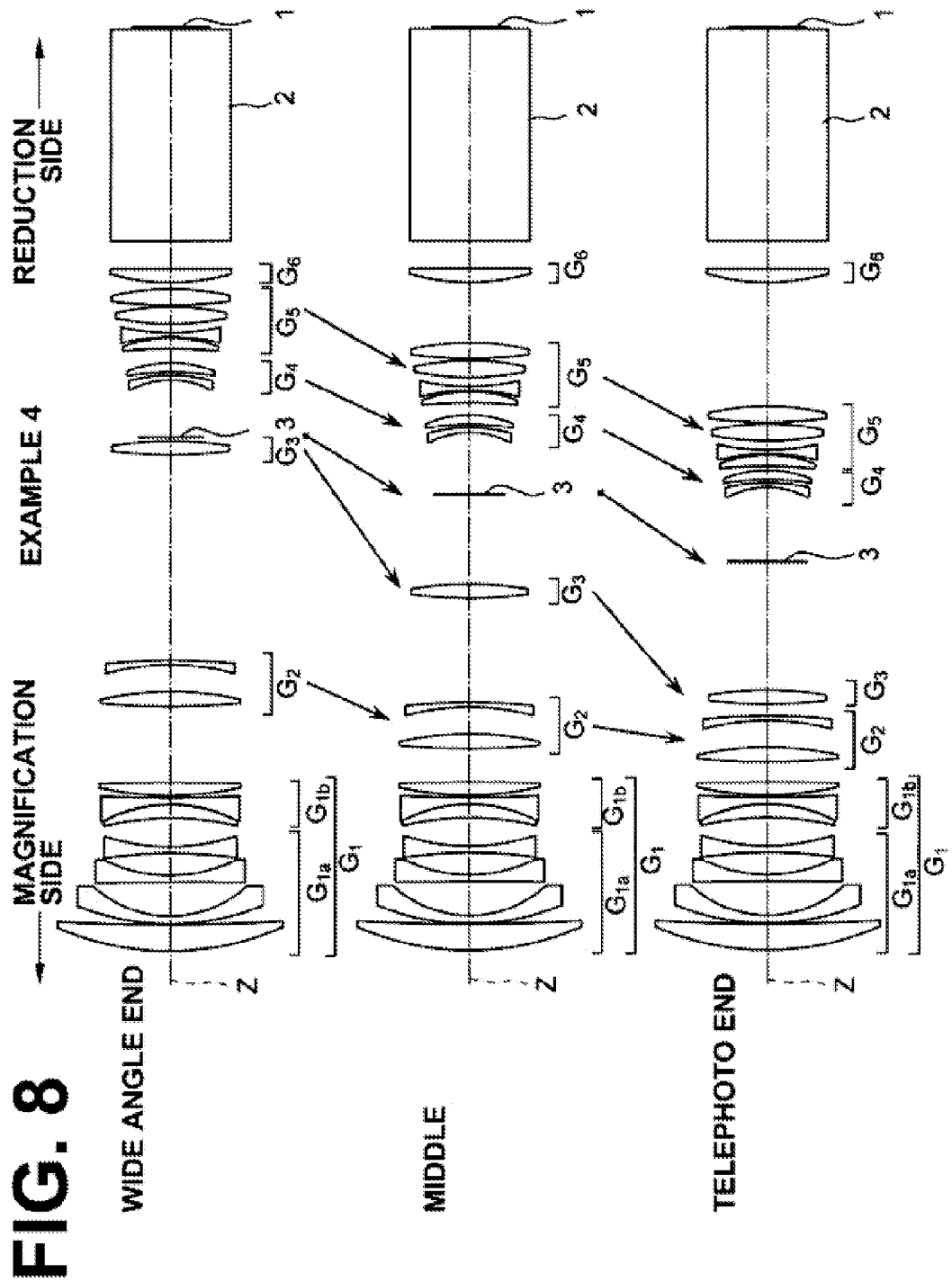
FIG. 8 is a diagram illustrating movement positions of lens groups in the zoom lens for projection of Example 4 at wide angle end (WIDE), at middle position (MIDDLE) and at telephoto end (TELE)

FIG. 8 is a diagram illustrating movement positions of lens groups in the zoom lens for projection of Example 4 at wide angle end (WIDE), at middle position (MIDDLE) and at telephoto end (TELE). FIG. 8 illustrates the positions of the lens groups that move based on an operation for changing magnification.

Table 4 shows radius R of curvature of each lens surface, center thickness D of each lens and air space D between lenses in Example 4. Further, Table 4 shows refractive index $N_d$ and Abbe number $v_d$ of each lens with respect to d-line.

Further, the top of Table 4 shows focal length f, F-number Fno., and full angle 2ω of view.

Further, the lower section of Table 4 shows variable distances at wide angle end (WIDE: zoom ratio is 1.00), at middle position (MIDDLE: zoom ratio is 1.40), and at telephoto end (TELE: zoom ratio is 1.80). Specifically, Table 4 shows distance $D_8$ (VARIABLE 1) between front group $G_{1a}$ of the first lens group and rear group $G_{1b}$ of the first lens group, distance $D_{14}$ (VARIABLE 2) between rear group $G_{1b}$ of the first lens group and second lens group $G_2$, distance $D_{18}$ (VARIABLE 3) between second lens group $G_2$ and third lens group $G_a$, distance $D_{20}$ (VARIABLE 4) between third lens group $G_3$ and the aperture stop 3, distance $D_{21}$ (VARIABLE 5) between the aperture stop 3 and fourth lens group $G_4$, distance $D_{25}$ (VARIABLE 6) between fourth lens group $G_4$ and fifth lens group $G_5$, and distance $D_{33}$ (VARIABLE 7) between fifth lens group $G_5$ and sixth lens group $G_6$. Further, Table 4 shows the diameter of the aperture stop (variable stop) 3.

TABLE 4

| | f = 1.00~1.80, Fno = 2.8, 2 ω = 57.4°~33.6° | | | |
|---|---|---|---|---|
| SURFACE NUMBER | CURVATURE OF RADIUS R | CENTER THICKNESS D | $N_d$ | $v_d$ |
| 1 | 3.8196 | 0.3693 | 1.713000 | 53.9 |
| 2 | 25.7907 | 0.0085 | | |
| 3 | 3.3006 | 0.1108 | 1.497000 | 81.6 |
| 4 | 1.5457 | 0.4798 | | |
| 5 | −53.1717 | 0.0959 | 1.808090 | 22.8 |
| 6 | 2.0182 | 0.3141 | | |
| 7 | −6.3685 | 0.0938 | 1.618000 | 63.3 |
| 8 | 2.9468 | (VARIABLE 1) | | |
| 9 | −4.0798 | 0.1888 | 1.834000 | 37.2 |
| 10 | −1.9748 | 0.0067 | | |
| 11 | −1.9301 | 0.0903 | 1.487490 | 70.2 |
| 12 | 19.3947 | 0.0326 | | |
| 13 | 4.3975 | 0.1791 | 1.713000 | 53.9 |
| 14 | −52.0761 | (VARIABLE 2) | | |
| 15 | 9.9368 | 0.2104 | 1.806100 | 33.3 |
| 16 | −4.3057 | 0.3798 | | |
| 17 | −3.2996 | 0.0639 | 1.516330 | 64.1 |
| 18 | −8.4662 | (VARIABLE 3) | | |
| 19 | 6.7067 | 0.1965 | 1.438750 | 94.9 |
| 20 | −4.9205 | (VARIABLE 4) | | |
| 21 | ∞ (STOP) | (VARIABLE 5) | | |
| 22 | −1.1473 | 0.0662 | 1.720470 | 34.7 |
| 23 | −2.2249 | 0.0449 | | |
| 24 | −3.5777 | 0.1336 | 1.696800 | 55.5 |
| 25 | −1.5326 | (VARIABLE 6) | | |
| 26 | −6.5163 | 0.1603 | 1.497000 | 81.6 |
| 27 | −1.7630 | 0.0138 | | |
| 28 | −2.6591 | 0.0535 | 1.804000 | 46.6 |
| 29 | 2.9175 | 0.1302 | | |
| 30 | 3.6932 | 0.2446 | 1.438750 | 94.9 |
| 31 | −3.4372 | 0.0235 | | |
| 32 | 6.1221 | 0.2281 | 1.497000 | 81.6 |
| 33 | −3.5739 | (VARIABLE 7) | | |
| 34 | 3.0805 | 0.1935 | 1.603110 | 60.6 |
| 35 | ∞ | 0.3903 | | |
| 36 | ∞ | 3.0000 | 1.516330 | 64.1 |
| 37 | ∞ | | | |

TABLE 4-continued

VARIABLE DISTANCE IN THE COLUMN
"CENTER THICKNESS D" AND DIAMETER OF STOP

| ZOOM RATIO | VARIABLE 1 | VARIABLE 2 | VARIABLE 3 | VARIABLE 4 |
|---|---|---|---|---|
| 1.00 | 0.3905 | 1.0865 | 2.9091 | 0.0550 |
| 1.40 | 0.3905 | 0.4862 | 1.4686 | 1.2791 |
| 1.80 | 0.3905 | 0.2931 | 0.1658 | 1.8151 |

| ZOOM RATIO | VARIABLE 5 | VARIABLE 6 | VARIABLE 7 | DIAMETER OF STOP |
|---|---|---|---|---|
| 1.00 | 0.8124 | 0.1962 | 0.0905 | 0.556 |
| 1.40 | 0.8800 | 0.1773 | 0.8586 | 0.501 |
| 1.80 | 1.0600 | 0.0541 | 1.7617 | 0.455 |

Further, Table 8 shows numerical values corresponding to formulas (1) through (8) with respect to Example 4.

FIGS. 18Ai, 18Aii, 18Aiii and 18Aiv are diagrams illustrating various aberrations (spherical aberration, astigmatism, distortion, and lateral chromatic aberration, respectively) of the zoom lens for projection in Example 4 at wide angle end (WIDE). FIGS. 18Bi, 18Bii, 18Biii and 18Biv are diagrams illustrating various aberrations (spherical aberration, astigmatism, distortion, and lateral chromatic aberration, respectively) of the zoom lens for projection in Example 4 at middle position (MIDDLE). FIGS. 18Ci, 18Cii, 18Ciii and 18Civ are diagrams illustrating various aberrations (spherical aberration, astigmatism, distortion, and lateral chromatic aberration, respectively) of the zoom lens for projection in Example 4 at telephoto end (TELE).

As FIGS. 18Ai, 18Bi and 18Ci illustrating spherical aberrations indicate, F-number Fno is constant at 2.80 at wide angle end (WIDE), at middle position (MIDDLE), and at telephoto end (TELE).

As FIGS. 18Ai through 18Civ and Table 4 clearly indicate, the zoom lens for projection in Example 4 can correct aberrations in an excellent manner through the entire range of zooming. Further, appropriate back focus and excellent telecentricity on the reduction side are obtainable. Further, a small F-number (fast lens), compactness, a wide angle of view, and a large zoom ratio are achievable in an excellently balanced manner. Especially, it is possible to make the F-number constant through the entire range of variable magnification.

Further, focusing is performed by moving rear group $G_{1b}$ of the first lens group, and the rear group $G_{1b}$ is composed of three lenses. Therefore, it is possible to reduce the load on a mechanism for a focusing operation.

Further, the zoom ratio is set at 1.80, which is large. Therefore, the zoom lens for projection can cope with a wide range of projection distance.

Example 5

Figure 9:
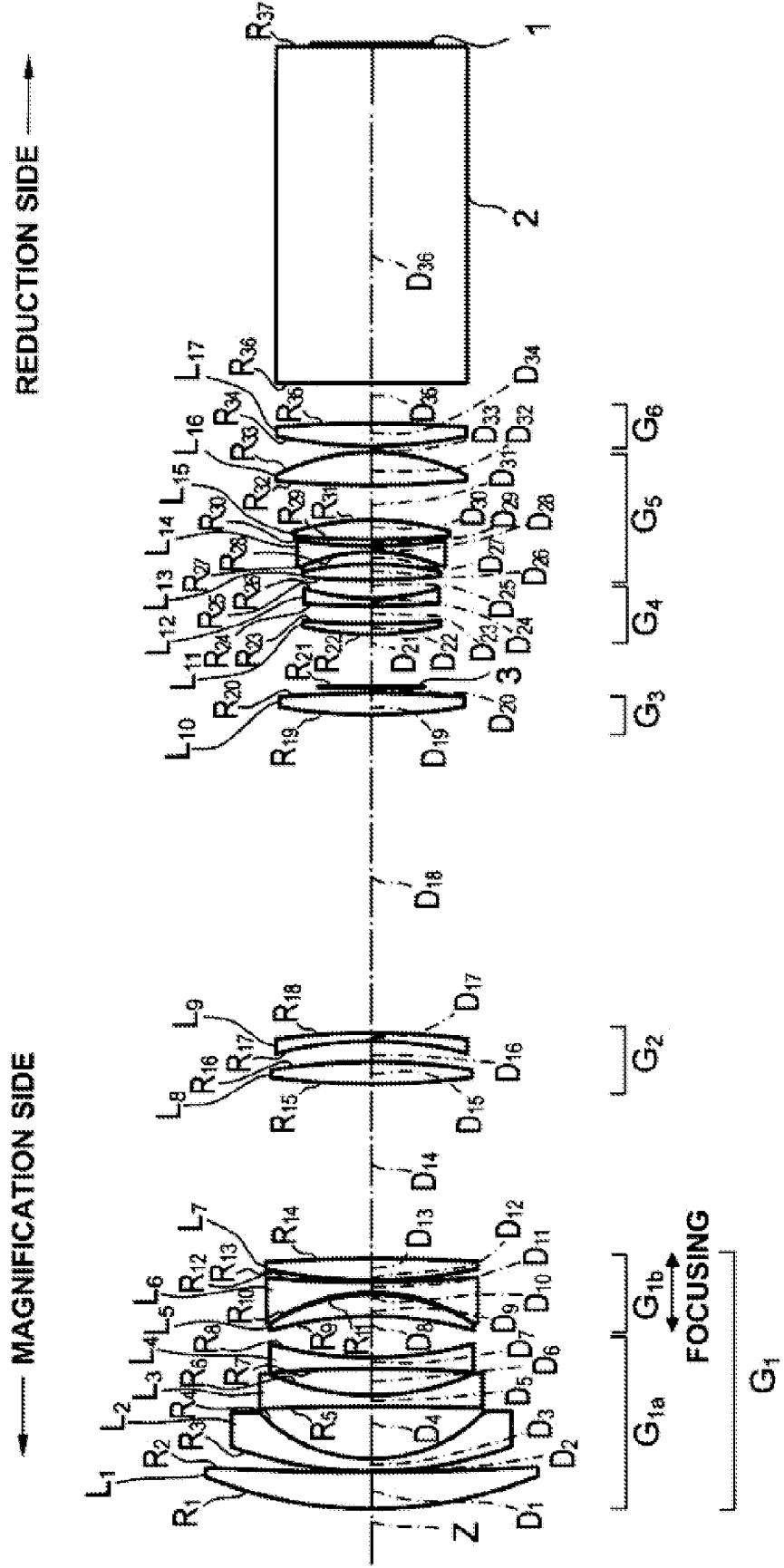
FIG. 9 is a diagram illustrating the structure of a zoom lens for projection in Example 5.

A zoom lens for projection in Example 5 is structured as illustrated in FIG. 9. The structure of the zoom lens for projection in Example 5 is substantially similar to that of the zoom lens for projection in Example 4. However, Example 5 differs from Example 4 in that eleventh lens $L_{11}$ is a positive meniscus lens having a convex surface facing the magnification side, and that twelfth lens $L_{12}$ is a negative meniscus lens having a convex surface facing the magnification side, and that thirteenth lens $L_{13}$ is a double-convex lens, and that seventeenth lens $L_{17}$ is a double-convex lens.

Figure 10:
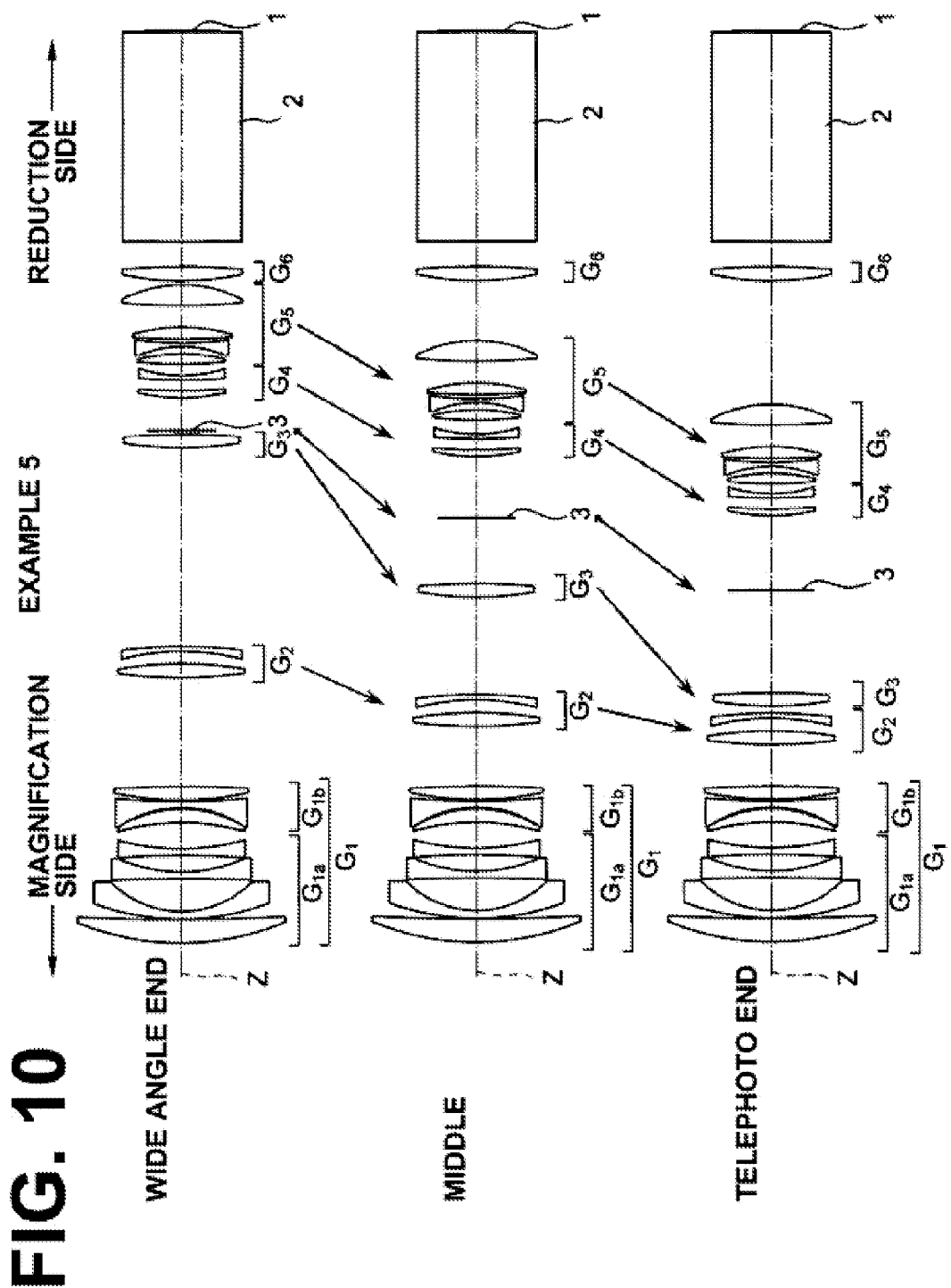
FIG. 10 is a diagram illustrating movement positions of lens groups in the zoom lens for projection of Example 5 at wide angle end (WIDE), at middle position (MIDDLE) and at telephoto end (TELE)

FIG. 10 is a diagram illustrating movement positions of lens groups in the zoom lens for projection of Example 5 at wide angle end (WIDE), at middle position (MIDDLE) and at telephoto end (TELE). FIG. 10 illustrates the positions of the lens groups that move based on an operation for changing magnification.

Table 5 shows radius R of curvature of each lens surface, center thickness D of each lens and air space D between lenses in Example 5. Further, Table 5 shows refractive index $N_d$ and Abbe number $v_d$ of each lens with respect to d-line. Further, the top of Table 5 shows focal length f, F-number Fno., and full angle 2ω of view.

Further, the lower section of Table 5 shows variable distances at wide angle end (WIDE: zoom ratio is 1.00), at middle position (MIDDLE: zoom ratio is 1.40), and at telephoto end (TELE: zoom ratio is 1.80). Specifically, Table 5 shows distance $D_8$ (VARIABLE 1) between front group $G_{1a}$ of the first lens group and rear group $G_{1b}$ of the first lens group, distance $D_{14}$ (VARIABLE 2) between rear group $G_{1b}$ of the first lens group and second lens group $G_2$, distance $D_{18}$ (VARIABLE 3) between second lens group $G_2$ and third lens group $G_3$, distance $D_{20}$ (VARIABLE 4) between third lens group $G_3$ and the aperture stop 3, distance $D_{21}$ (VARIABLE 5) between the aperture stop 3 and fourth lens group $G_4$, distance $D_{25}$ (VARIABLE 6) between fourth lens group $G_4$ and fifth lens group $G_5$, and distance $D_{33}$ (VARIABLE 7) between fifth lens group $G_5$ and sixth lens group $G_6$. Further, Table 5 shows the diameter of the aperture stop (variable stop) 3.

TABLE 5 f = 1.00~1.80, Fno = 2.8, 2 ω = 57.6°~33.8°

| SURFACE NUMBER | CURVATURE OF RADIUS R | CENTER THICKNESS D | $N_d$ | $v_d$ |
|---|---|---|---|---|
| 1 | 3.7557 | 0.3288 | 1.713000 | 53.9 |
| 2 | 24.4472 | 0.0085 | | |
| 3 | 3.4695 | 0.1109 | 1.497000 | 81.6 |
| 4 | 1.3720 | 0.4661 | | |
| 5 | −29.3798 | 0.0960 | 1.808090 | 22.8 |
| 6 | 2.1611 | 0.2398 | | |

TABLE 5-continued

| | | | | |
|---|---|---|---|---|
| 7 | −10.9155 | 0.0938 | 1.618000 | 63.3 |
| 8 | 3.2267 | (VARIABLE 1) | | |
| 9 | −3.1785 | 0.1892 | 1.806100 | 40.9 |
| 10 | −1.6772 | 0.0211 | | |
| 11 | −1.5750 | 0.0917 | 1.487490 | 70.2 |
| 12 | 10.4092 | 0.0189 | | |
| 13 | 4.4039 | 0.1904 | 1.713000 | 53.9 |
| 14 | −15.1700 | (VARIABLE 2) | | |
| 15 | 6.8729 | 0.1966 | 1.807292 | 33.5 |
| 16 | −5.4869 | 0.1809 | | |
| 17 | −3.2496 | 0.0738 | 1.519499 | 64.1 |
| 18 | −6.3124 | (VARIABLE 3) | | |
| 19 | 4.6819 | 0.1913 | 1.438750 | 94.9 |
| 20 | −9.9835 | (VARIABLE 4) | | |
| 21 | ∞ (STOP) | (VARIABLE 5) | | |
| 22 | 2.6419 | 0.0981 | 1.695892 | 55.6 |
| 23 | 8.0442 | 0.1554 | | |
| 24 | 8.8840 | 0.0665 | 1.744259 | 31.4 |
| 25 | 1.9317 | (VARIABLE 6) | | |
| 26 | 5.4600 | 0.1465 | 1.497000 | 81.6 |
| 27 | −2.6145 | 0.1043 | | |
| 28 | −1.5375 | 0.0533 | 1.804000 | 46.6 |
| 29 | 4.7710 | 0.0598 | | |
| 30 | 9.1618 | 0.1710 | 1.438750 | 94.9 |
| 31 | −2.3923 | 0.3092 | | |
| 32 | 8.7469 | 0.2990 | 1.497000 | 81.6 |
| 33 | −1.7993 | (VARIABLE 7) | | |
| 34 | 4.0383 | 0.2026 | 1.572405 | 62.2 |
| 35 | −10.4777 | 0.3555 | | |
| 36 | ∞ | 3.0000 | 1.516330 | 64.1 |
| 37 | ∞ | | | |

VARIABLE DISTANCE IN THE COLUMN
"CENTER THICKNESS D" AND DIAMETER OF STOP

| ZOOM RATIO | VARIABLE 1 | VARIABLE 2 | VARIABLE 3 | VARIABLE 4 |
|---|---|---|---|---|
| 1.00 | 0.3599 | 1.5698 | 2.8387 | 0.0550 |
| 1.40 | 0.3599 | 0.8678 | 1.3926 | 0.9473 |
| 1.80 | 0.3599 | 0.6044 | 0.0961 | 1.4750 |

| ZOOM RATIO | VARIABLE 5 | VARIABLE 6 | VARIABLE 7 | DIAMETER OF STOP |
|---|---|---|---|---|
| 1.00 | 0.4737 | 0.1618 | 0.0552 | 0.602 |
| 1.40 | 0.8800 | 0.2055 | 0.8610 | 0.542 |
| 1.80 | 1.0600 | 0.1423 | 1.7763 | 0.476 |

Further, Table 8 shows numerical values corresponding to formulas (1) through (8) with respect to Example 5.

FIGS. 19Ai, 19Aii, 19Aiii and 19Aiv are diagrams illustrating various aberrations (spherical aberration, astigmatism, distortion, and lateral chromatic aberration, respectively) of the zoom lens for projection in Example 5 at wide angle end (WIDE). FIGS. 19Bi, 19Bii, 19Biii and 19Biv are diagrams illustrating various aberrations (spherical aberration, astigmatism, distortion, and lateral chromatic aberration, respectively) of the zoom lens for projection in Example 5 at middle position (MIDDLE). FIGS. 19Ci, 19Cii, 19Ciii and 19Civ are diagrams illustrating various aberrations (spherical aberration, astigmatism, distortion, and lateral chromatic aberration, respectively) of the zoom lens for projection in Example 5 at telephoto end (TELE).

As FIGS. 19Ai, 19Bi and 19Ci illustrating spherical aberrations indicate, F-number Fno is constant at 2.80 at wide angle end (WIDE), at middle position (MIDDLE), and at telephoto end (TELE).

As FIGS. 19Ai through 19Civ and Table 5 clearly indicate, the zoom lens for projection in Example 5 can correct aberrations in an excellent manner through the entire range of zooming. Further, appropriate back focus and excellent telecentricity on the reduction side are obtainable. Further, a small F-number (fast lens), compactness, a wide angle of view, and a large zoom ratio are achievable in an excellently balanced manner. Especially, it is possible to make the F-number constant through the entire range of variable magnification.

Further, focusing is performed by moving rear group $G_{1b}$ of the first lens group, and the rear group $G_{1b}$ is composed of three lenses. Therefore, it is possible to reduce the load on a mechanism for a focusing operation.

Further, the zoom ratio is set at 1.80, which is large. Therefore, the zoom lens for projection can cope with a wide range of projection distance.

Example 6

Figure 11:
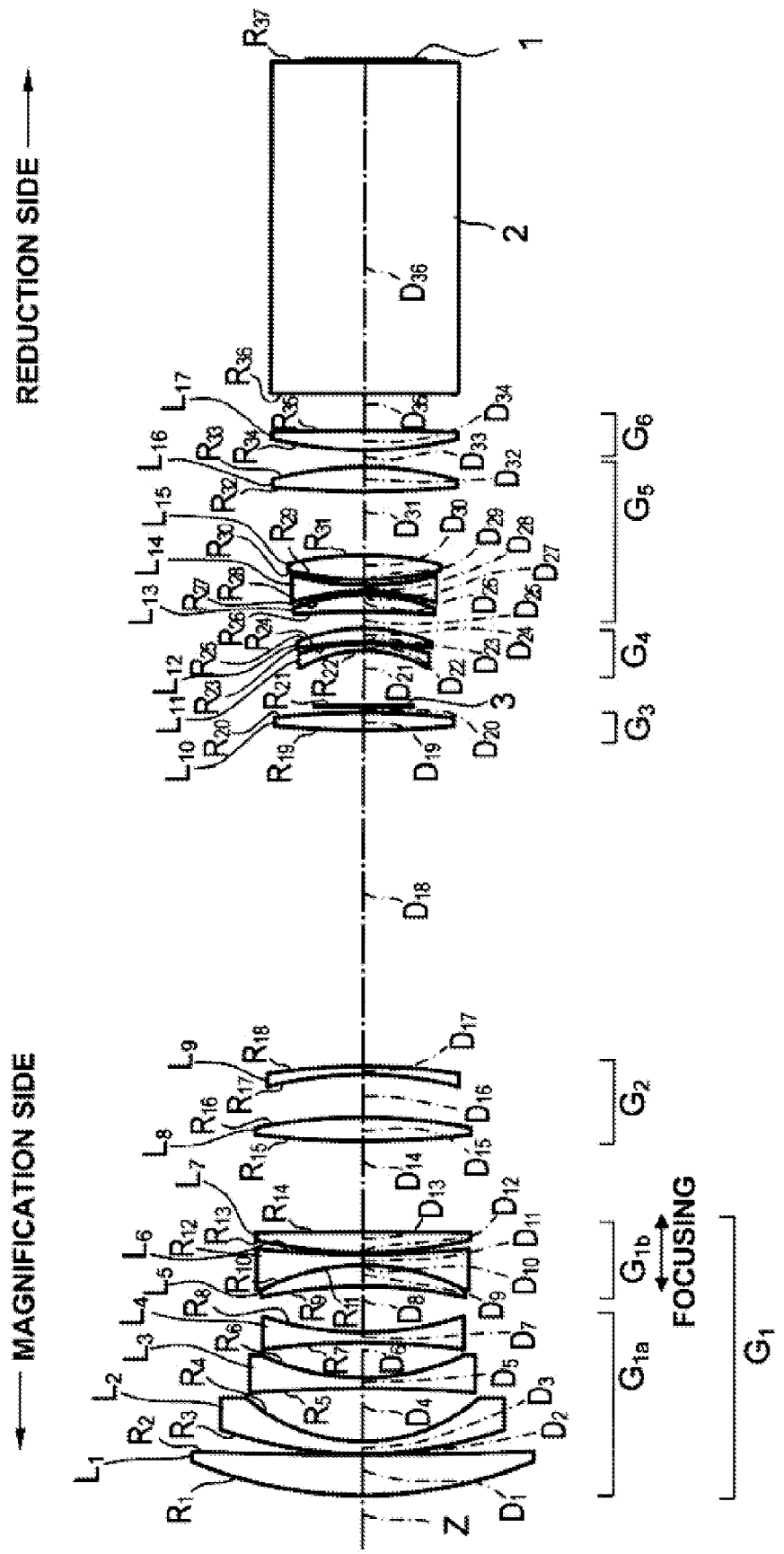
FIG. 11 is a diagram illustrating the structure of a zoom lens for projection in Example 6.

A zoom lens for projection in Example 6 is structured as illustrated in FIG. 11. The structure of the zoom lens for projection in Example 6 is substantially similar to that of the zoom lens for projection in Example 4. However, Example 6 differs from Example 4 in that seventeenth lens $L_{17}$ is a double-convex lens.

Figure 12:
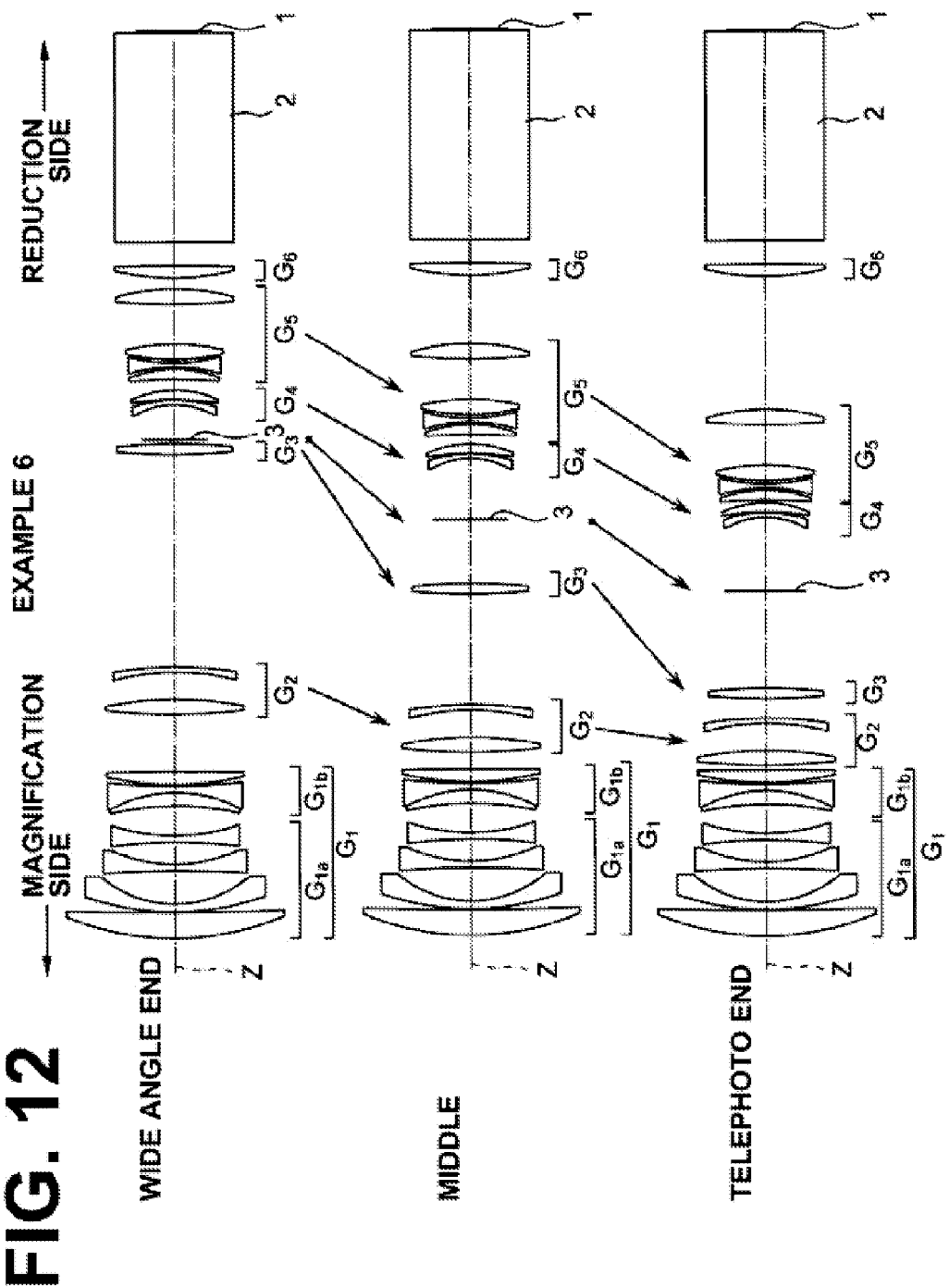
FIG. 12 is a diagram illustrating movement positions of lens groups in the zoom lens for projection of Example 6 at wide angle end (WIDE), at middle position (MIDDLE) and at telephoto end (TELE)

FIG. 12 is a diagram illustrating movement positions of lens groups in the zoom lens for projection of Example 6 at wide angle end (WIDE), at middle position (MIDDLE) and at telephoto end (TELE). FIG. 12 illustrates the positions of the lens groups that move based on an operation for changing magnification.

Further, Table 6 shows radius R of curvature of each lens surface, center thickness D of each lens and air space D between lenses in Example 6. Further, Table 6 shows refractive index $N_d$ and Abbe number $v_d$ of each lens with respect to d-line.

Further, the top of Table 6 shows focal length f, F-number Fno., and full angle 2ω of view.

Further, the lower section of Table 6 shows variable distances at wide angle end (WIDE: zoom ratio is 1.00), at middle position (MIDDLE: zoom ratio is 1.40), and at telephoto end (TELE: zoom ratio is 1.80). Specifically, Table 6 shows distance $D_8$ (VARIABLE 1) between front group $G_{1a}$ of the first lens group and rear group $G_{1b}$ of the first lens group, distance $D_{14}$ (VARIABLE 2) between rear group $G_{1b}$ of the first lens group and second lens group $G_2$, distance $D_{18}$ (VARIABLE 3) between second lens group $G_2$ and third lens group $G_3$, distance $D_{20}$ (VARIABLE 4) between third lens group $G_3$ and the aperture stop 3, distance $D_{21}$ (VARIABLE 5) between the aperture stop 3 and fourth lens group $G_4$, distance $D_{25}$ (VARIABLE 6) between fourth lens group $G_4$ and fifth lens group $G_5$, and distance $D_{33}$ (VARIABLE 7) between fifth lens group $G_5$ and sixth lens group $G_6$. Further, Table 6 shows the diameter of the aperture stop (variable stop) 3.

TABLE 6 f = 1.00~1.80, Fno = 2.8, 2 ω = 57.6°~33.8°

| SURFACE NUMBER | CURVATURE OF RADIUS R | CENTER THICKNESS D | $N_d$ | $v_d$ |
|---|---|---|---|---|
| 1 | 3.8938 | 0.3685 | 1.729147 | 55.1 |
| 2 | 42.5392 | 0.0085 | | |
| 3 | 3.7216 | 0.1109 | 1.497000 | 81.6 |
| 4 | 1.5585 | 0.4767 | | |
| 5 | −14.5739 | 0.0959 | 1.808090 | 22.8 |
| 6 | 2.1126 | 0.3140 | | |
| 7 | −6.9806 | 0.0938 | 1.618000 | 63.3 |
| 8 | 2.7612 | (VARIABLE 1) | | |
| 9 | −4.1444 | 0.1919 | 1.834000 | 37.2 |
| 10 | −1.8981 | 0.0050 | | |
| 11 | −1.8663 | 0.0911 | 1.516330 | 64.1 |
| 12 | 8.0846 | 0.0212 | | |
| 13 | 4.1334 | 0.1838 | 1.772500 | 49.6 |
| 14 | −79.4622 | (VARIABLE 2) | | |
| 15 | 7.9448 | 0.2133 | 1.809952 | 31.8 |
| 16 | −4.8406 | 0.3885 | | |
| 17 | −3.3425 | 0.0749 | 1.509268 | 61.4 |
| 18 | −5.5084 | (VARIABLE 3) | | |
| 19 | 8.7388 | 0.1568 | 1.620410 | 60.3 |
| 20 | −7.0601 | (VARIABLE 4) | | |
| 21 | ∞ (STOP) | (VARIABLE 5) | | |
| 22 | −1.0941 | 0.0654 | 1.729789 | 33.3 |
| 23 | −1.8483 | 0.0105 | | |
| 24 | −3.4174 | 0.1322 | 1.683391 | 54.3 |
| 25 | −1.4285 | (VARIABLE 6) | | |
| 26 | −9.0242 | 0.1514 | 1.497000 | 81.6 |
| 27 | −1.7028 | 0.0349 | | |
| 28 | −2.0202 | 0.0540 | 1.804000 | 46.6 |
| 29 | 2.5490 | 0.0473 | | |
| 30 | 2.7411 | 0.2234 | 1.438750 | 94.9 |
| 31 | −2.9131 | 0.5773 | | |
| 32 | 9.0835 | 0.2225 | 1.497000 | 81.6 |
| 33 | −2.9161 | (VARIABLE 7) | | |
| 34 | 3.5144 | 0.1747 | 1.573852 | 61.9 |
| 35 | −24.5833 | 0.3316 | | |
| 36 | ∞ | 3.0000 | 1.516330 | 64.1 |
| 37 | ∞ | | | |

VARIABLE DISTANCE IN THE COLUMN "CENTER THICKNESS D" AND DIAMETER OF STOP

| ZOOM RATIO | VARIABLE 1 | VARIABLE 2 | VARIABLE 3 | VARIABLE 4 |
|---|---|---|---|---|
| 1.00 | 0.4050 | 0.8311 | 3.0439 | 0.0550 |
| 1.40 | 0.4050 | 0.2486 | 1.5798 | 0.9125 |
| 1.80 | 0.4050 | 0.0707 | 0.2752 | 1.3846 |

| ZOOM RATIO | VARIABLE 5 | VARIABLE 6 | VARIABLE 7 | DIAMETER OF STOP |
|---|---|---|---|---|
| 1.00 | 0.5050 | 0.1483 | 0.1540 | 0.570 |
| 1.40 | 0.8800 | 0.1338 | 0.9825 | 0.518 |
| 1.80 | 1.0600 | 0.0346 | 1.9121 | 0.455 |

Further, Table 8 shows numerical values corresponding to formulas (1) through (8) with respect to Example 6.

FIGS. 20Ai, 20Aii, 20Aiii and 20Aiv are diagrams illustrating various aberrations (spherical aberration, astigmatism, distortion, and lateral chromatic aberration, respectively) of the zoom lens for projection in Example 6 at wide angle end (WIDE). FIGS. 20Bi, 20Bii, 20Biii and 20Biv are diagrams illustrating various aberrations (spherical aberration, astigmatism, distortion, and lateral chromatic aberration, respectively) of the zoom lens for projection in Example 6 at middle position (MIDDLE). FIGS. 20Ci, 20Cii, 20Ciii and 20Civ are diagrams illustrating various aberrations (spherical aberration, astigmatism, distortion, and lateral chromatic aberration, respectively) of the zoom lens for projection in Example 6 at telephoto end (TELE).

As FIGS. 20Ai, 20Bi and 20Ci illustrating spherical aberrations indicate, F-number Fno is constant at 2.80 at wide angle end (WIDE), at middle position (MIDDLE), and at telephoto end (TELE).

As FIGS. 20Ai through 20Civ and Table 6 clearly indicate, the zoom lens for projection in Example 6 can correct aberrations in an excellent manner through the entire range of zooming. Further, appropriate back focus and excellent telecentricity on the reduction side are obtainable. Further, a small F-number (fast lens), compactness, a wide angle of view, and a large zoom ratio are achievable in an excellently balanced manner. Especially, it is possible to make the F-number constant through the entire range of variable magnification.

Further, focusing is performed by moving rear group $G_{1b}$ of the first lens group, and the rear group $G_{1b}$ is composed of three lenses. Therefore, it is possible to reduce the load on a mechanism for a focusing operation.

Further, the zoom ratio is set at 1.80, which is large. Therefore, the zoom lens for projection can cope with a wide range of projection distance.

Example 7

A zoom lens for projection in Example 7 is structured as illustrated in FIG. 13. The structure of the zoom lens for projection in Example 7 is substantially similar to that of the zoom lens for projection in Example 6. However, Example 7 differs from Example 6 in that fifth lens $L_5$ and sixth lens $L_6$ are cemented together to form a cemented lens (therefore, in Table 7, numbers in the column of surface numbers corresponding to the values in the columns of signs R, D are moved up one after the cemented lens, compared with Example 6).

FIG. 14 is a diagram illustrating movement positions of lens groups in the zoom lens for projection of Example 7 at wide angle end (WIDE), at middle position (MIDDLE) and at telephoto end (TELE). FIG. 14 illustrates the positions of the lens groups that move based on an operation for changing magnification.

Further, Table 7 shows radius R of curvature of each lens surface, center thickness D of each lens and air space D between lenses in Example 7. Further, Table 7 shows refractive index $N_d$ and Abbe number $v_d$ of each lens with respect to d-line.

Further, the top of Table 7 shows focal length f, F-number Fno., and full angle $2\omega$ of view.

Further, the lower section of Table 7 shows variable distances at wide angle end (WIDE: zoom ratio is 1.00), at middle position (MIDDLE: zoom ratio is 1.40), and at telephoto end (TELE: zoom ratio is 1.80). Specifically, Table 7 shows distance $D_8$ (VARIABLE 1) between front group $G_{1a}$ of the first lens group and rear group $G_{1b}$ of the first lens group, distance $D_{13}$ (VARIABLE 2) between rear group $G_{1b}$ of the first lens group and second lens group $G_2$, distance $D_{17}$ (VARIABLE 3) between second lens group $G_2$ and third lens group $G_3$, distance $D_{19}$ (VARIABLE 4) between third lens group $G_3$ and the aperture stop 3, distance $D_{20}$ (VARIABLE 5) between the aperture stop 3 and fourth lens group $G_4$, distance $D_{24}$ (VARIABLE 6) between fourth lens group $G_4$ and fifth lens group $G_5$, and distance $D_{32}$ (VARIABLE 7) between fifth lens group $G_5$ and sixth lens group $G_6$. Further, Table 7 shows the diameter of the aperture stop (variable stop) 3.

TABLE 7 f = 1.00~1.80, Fno = 2.8, 2ω = 57.6°~33.8°

| SURFACE NUMBER | CURVATURE OF RADIUS R | CENTER THICKNESS D | $N_d$ | $v_d$ |
| --- | --- | --- | --- | --- |
| 1 | 3.8674 | 0.3790 | 1.723248 | 55.3 |
| 2 | 41.8628 | 0.0085 | | |
| 3 | 3.8316 | 0.1108 | 1.497000 | 81.6 |
| 4 | 1.5589 | 0.5065 | | |
| 5 | −12.8970 | 0.0959 | 1.808090 | 22.8 |
| 6 | 2.1350 | 0.3090 | | |
| 7 | −6.7421 | 0.0938 | 1.618000 | 63.3 |
| 8 | 2.7982 | (VARIABLE 1) | | |
| 9 | −4.2050 | 0.1918 | 1.834000 | 37.2 |
| 10 | −1.9308 | 0.0914 | 1.516330 | 64.1 |
| 11 | 7.9774 | 0.0203 | | |
| 12 | 4.1276 | 0.1857 | 1.772500 | 49.6 |
| 13 | −74.2927 | (VARIABLE 2) | | |
| 14 | 7.9367 | 0.2131 | 1.809998 | 31.8 |
| 15 | −4.8911 | 0.3937 | | |
| 16 | −3.4252 | 0.0640 | 1.515723 | 63.3 |
| 17 | −5.6030 | (VARIABLE 3) | | |
| 18 | 8.6619 | 0.1577 | 1.620410 | 60.3 |
| 19 | −6.9063 | (VARIABLE 4) | | |
| 20 | ∞ (STOP) | (VARIABLE 5) | | |
| 21 | −1.0935 | 0.0654 | 1.729307 | 34.0 |
| 22 | −1.8412 | 0.0104 | | |
| 23 | −3.4244 | 0.1327 | 1.683317 | 56.1 |
| 24 | −1.4280 | (VARIABLE 6) | | |
| 25 | −8.9041 | 0.1507 | 1.497000 | 81.6 |
| 26 | −1.7052 | 0.0352 | | |
| 27 | −2.0184 | 0.0573 | 1.804000 | 46.6 |
| 28 | 2.5495 | 0.0475 | | |
| 29 | 2.7401 | 0.2311 | 1.438750 | 94.9 |

TABLE 7-continued

| | | | | |
|---|---|---|---|---|
| 30 | −2.9307 | 0.5819 | | |
| 31 | 9.3205 | 0.2198 | 1.497000 | 81.6 |
| 32 | −2.9194 | (VARIABLE 7) | | |
| 33 | 3.5179 | 0.1738 | 1.578368 | 62.0 |
| 34 | −26.3945 | 0.3346 | | |
| 35 | ∞ | 3.0000 | 1.516330 | 64.1 |
| 36 | ∞ | | | |

VARIABLE DISTANCE IN THE COLUMN "CENTER THICKNESS D" AND DIAMETER OF STOP

| ZOOM RATIO | VARIABLE 1 | VARIABLE 2 | VARIABLE 3 | VARIABLE 4 |
|---|---|---|---|---|
| 1.00 | 0.4022 | 0.8222 | 3.0651 | 0.0550 |
| 1.40 | 0.4022 | 0.2384 | 1.6186 | 0.8966 |
| 1.80 | 0.4022 | 0.0617 | 0.3232 | 1.3613 |

| ZOOM RATIO | VARIABLE 5 | VARIABLE 6 | VARIABLE 7 | DIAMETER OF STOP |
|---|---|---|---|---|
| 1.00 | 0.5020 | 0.1515 | 0.1434 | 0.572 |
| 1.40 | 0.8800 | 0.1384 | 0.9672 | 0.520 |
| 1.80 | 1.0600 | 0.0349 | 1.8979 | 0.456 |

Further, Table 8 shows numerical values corresponding to formulas (1) through (8) with respect to Example 7.

FIGS. 21Ai, 21Aii, 21Aiii and 21Aiv are diagrams illustrating various aberrations (spherical aberration, astigmatism, distortion, and lateral chromatic aberration, respectively) of the zoom lens for projection in Example 7 at wide angle end (WIDE). FIGS. 21Bi, 21Bii, 21Biii and 21Biv are diagrams illustrating various aberrations (spherical aberration, astigmatism, distortion, and lateral chromatic aberration, respectively) of the zoom lens for projection in Example 7 at middle position (MIDDLE). FIGS. 21Ci, 21Cii, 21Ciii and 21Civ are diagrams illustrating various aberrations (spherical aberration, astigmatism, distortion, and lateral chromatic aberration, respectively) of the zoom lens for projection in Example 7 at telephoto end (TELE).

As FIGS. 21Ai, 21Bi and 21Ci illustrating spherical aberrations indicate, F-number Fno is constant at 2.80 at wide angle end (WIDE), at middle position (MIDDLE), and at telephoto end (TELE).

As FIGS. 21Ai through 21Civ and Table 7 clearly indicate, the zoom lens for projection in Example 7 can correct aberrations in an excellent manner through the entire range of zooming. Further, appropriate back focus and excellent telecentricity on the reduction side are obtainable. Further, a small F-number (fast lens), compactness, a wide angle of view, and a large zoom ratio are achievable in an excellently balanced manner. Especially, it is possible to make the F-number constant through the entire range of variable magnification.

Further, focusing is performed by moving rear group $G_{1b}$ of the first lens group, and the rear group $G_{1b}$ is composed of three lenses. Therefore, it is possible to reduce the load on a mechanism for a focusing operation.

Further, the zoom ratio is set at 1.80, which is large. Therefore, the zoom lens for projection can cope with a wide range of projection distance.

TABLE 8

| | FORMULA | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| (1), (1') | $N_{dRpAVE}$ | 1.7867 | 1.7651 | 1.7816 | 1.7735 | 1.7596 | 1.8033 | 1.8033 |
| (2), (2') | $v_{dRn}$ | 65.6 | 70.2 | 70.2 | 70.2 | 70.2 | 64.1 | 64.1 |
| (3), (3') | $f_1/f$ | −1.863 | −1.812 | −1.806 | −1.953 | −1.851 | −1.734 | −1.732 |
| (4), (4') | $f_2/f$ | 5.372 | 5.295 | 5.252 | 5.515 | 5.281 | 4.680 | 4.685 |
| (5), (5') | $f_3/f$ | 6.962 | 6.675 | 6.485 | 6.502 | 7.293 | 6.318 | 6.218 |
| (6), (6') | $f_{4-5}/f$ | 7.720 | 6.856 | 7.158 | 7.234 | 7.758 | 6.588 | 6.661 |
| (7) | $v_{dG3}$ | 94.9 | 94.9 | 94.9 | 94.9 | 94.9 | 60.3 | 60.3 |
| (8), (8') | Bf/f | 2.317 | 2.338 | 2.317 | 2.369 | 2.334 | 2.310 | 2.313 |

What is claimed is:

1. A zoom lens for projection comprising:
a magnification-side lens group having negative refractive power, and which is fixed while magnification is changed;
a plurality of lens groups that move along an optical axis while magnification is changed; and
a reduction-side lens group having positive refractive power, and which is fixed while magnification is changed, the magnification-side lens group, the plurality of lens groups, and the reduction-side lens group being arranged in this order from the magnification side of the zoom lens,
wherein the magnification-side lens group is composed of a front group having negative refractive power and a rear group having positive refractive power, which are arranged in this order from the magnification side, and
wherein the rear group is composed of a positive lens, a negative lens and a positive lens, which are arranged in this order from the magnification side, and
wherein focusing is performed by moving the rear group along the optical axis, and
wherein the reduction side of the zoom lens is telecentric, and
wherein the following formulas (1) and (2) are satisfied:

$$1.73 < N_{dRpAVE} \quad (1);$$

and $$60 < \nu_{dRn} \quad (2),$$

where $N_{dRpAVE}$ is an average value of refractive indices of the positive lenses in the rear group with respect to d-line, and $\nu_{dRn}$ is the Abbe number of the negative lens in the rear group with respect to d-line.

2. A zoom lens for projection, as defined in claim 1, wherein the zoom lens for projection as a whole is composed of six groups when the magnification-side lens group is regarded as one lens group, and wherein when the magnification-side lens group is a first lens group, the following formula (3) is satisfied:

$$-2.5 < f_1/f < -1.5 \quad (3),$$

where $f_1$ is a focal length of the first lens group when projection distance is at infinity, and $f$ is a focal length of the entire system of the zoom lens for projection at wide angle end when projection distance is at infinity.

3. A zoom lens for projection, as defined in claim 1, wherein the zoom lens for projection as a whole is composed of six groups when the magnification-side lens group is regarded as one lens group, and wherein when a most-magnification-side lens group of the plurality of lens groups is a second lens group, the following formula (4) is satisfied:

$$4.0 < f_2/f < 7.0 \quad (4),$$

where $f_2$ is a focal length of the second lens group, and $f$ is a focal length of the entire system of the zoom lens for projection at wide angle end when projection distance is at infinity.

4. A zoom lens for projection, as defined in claim 1, wherein the zoom lens for projection as a whole is composed of six groups when the magnification-side lens group is regarded as one lens group, and wherein when a lens group located at a second position from the magnification side of the plurality of lens groups is a third lens group, the following formula (5) is satisfied:

$$5.0 < f_3/f < 8.0 \quad (5),$$

where $f_3$ is a focal length of the third lens group, and $f$ is a focal length of the entire system of the zoom lens for projection at wide angle end when projection distance is at infinity.

5. A zoom lens for projection, as defined in claim 1, wherein the zoom lens for projection as a whole is composed of six groups when the magnification-side lens group is regarded as one lens group, and wherein when a lens group located at a third position from the magnification side of the plurality of lens groups is a fourth lens group and a lens group located at a fourth position from the magnification side of the plurality of lens groups is a fifth lens group, the following formula (6) is satisfied:

$$6.0 < f_{4-5}/f < 9.0 \quad (6),$$

where $f_{4-5}$ is a combined focal length of the fourth lens group and the fifth lens group at wide angle end, and $f$ is a focal length of the entire system of the zoom lens for projection at wide angle end when projection distance is at infinity.

6. A projection-type display apparatus comprising:
a light source;
a light valve; and
a zoom lens for projection, as defined in claim 1,
wherein the zoom lens for projection projects an optical image of light modulated by the light valve onto a screen.

7. A zoom lens for projection, as defined in claim 1, wherein the plurality of lens groups are composed of four groups of a positive lens group, a positive lens group, one of a positive lens group and a negative lens group, and a positive lens group, which are arranged in this order from the magnification side, and wherein a stop is arranged between a lens group located at a second position from the magnification side of the plurality of lens groups and a lens group located at a third position from the magnification side of the plurality of lens groups.

8. A zoom lens for projection, as defined in claim 7, wherein when a lens group located at a third position from the magnification side of the plurality of lens groups is a fourth lens group, the fourth lens group is composed of a positive lens and a negative lens.

9. A zoom lens for projection, as defined in claim 7, wherein when a lens group located at a fourth position from the magnification side of the plurality of lens groups is a fifth lens group, the fifth lens group is composed of a positive lens, a negative lens, a positive lens, and a positive lens, which are arranged in this order from the magnification side.

10. A projection-type display apparatus comprising:
a light source;
a light valve; and
a zoom lens for projection, as defined in claim 9,
wherein the zoom lens for projection projects an optical image of light modulated by the light valve onto a screen.

11. A zoom lens for projection, as defined in claim 1, wherein the negative lens in the rear group is a double-concave lens, and wherein the absolute value of the radius of curvature of a magnification-side surface of the negative lens in the rear group is smaller than the absolute value of the radius of curvature of a reduction-side surface of the negative lens in the rear group.

12. A zoom lens for projection, as defined in claim 11, wherein the plurality of lens groups are composed of four groups of a positive lens group, a positive lens group, one of a positive lens group and a negative lens group, and a positive lens group, which are arranged in this order from the magnification side, and wherein a stop is arranged between a lens group located at a second position from the magnification side of the plurality of lens groups and a lens group located at a third position from the magnification side of the plurality of lens groups.

13. A zoom lens for projection, as defined in claim 12, wherein the zoom lens for projection as a whole is composed of six groups when the magnification-side lens group is regarded as one lens group, and wherein when the magnification-side lens group is a first lens group, the following formula (3) is satisfied:

$$-2.5 < f_1/f < -1.5 \quad (3),$$

where
- $f_1$ is a focal length of the first lens group when projection distance is at infinity, and
- f is a focal length of the entire system of the zoom lens for projection at wide angle end when projection distance is at infinity.

14. A zoom lens for projection, as defined in claim 13, wherein the zoom lens for projection as a whole is composed of six groups when the magnification-side lens group is regarded as one lens group, and
wherein when a most-magnification-side lens group of the plurality of lens groups is a second lens group, the following formula (4) is satisfied:

$$4.0 < f_2/f < 7.0 \tag{4}$$

where
- $f_2$ is a focal length of the second lens group, and
- f is a focal length of the entire system of the zoom lens for projection at wide angle end when projection distance is at infinity.

15. A zoom lens for projection, as defined in claim 14, wherein the zoom lens for projection as a whole is composed of six groups when the magnification-side lens group is regarded as one lens group, and
wherein when a lens group located at a second position from the magnification side of the plurality of lens groups is a third lens group, the following formula (5) is satisfied:

$$5.0 < f_3/f < 8.0 \tag{5}$$

where
- $f_3$ is a focal length of the third lens group, and
- f is a focal length of the entire system of the zoom lens for projection at wide angle end when projection distance is at infinity.

16. A zoom lens for projection, as defined in claim 15, wherein the zoom lens for projection as a whole is composed of six groups when the magnification-side lens group is regarded as one lens group, and
wherein when a lens group located at a third position from the magnification side of the plurality of lens groups is a fourth lens group and a lens group located at a fourth position from the magnification side of the plurality of lens groups is a fifth lens group, the following formula (6) is satisfied:

$$6.0 < f_{4-5}/f < 9.0 \tag{6}$$

where
- $f_{4-5}$ is a combined focal length of the fourth lens group and the fifth lens group at wide angle end, and
- f is a focal length of the entire system of the zoom lens for projection at wide angle end when projection distance is at infinity.

17. A zoom lens for projection, as defined in claim 16, wherein the fourth lens group is composed of a positive lens and a negative lens.

18. A zoom lens for projection, as defined in claim 17, wherein the fifth lens group is composed of a positive lens, a negative lens, a positive lens, and a positive lens, which are arranged in this order from the magnification side.

19. A projection-type display apparatus comprising:
a light source;
a light valve; and
a zoom lens for projection, as defined in claim 18,
wherein the zoom lens for projection projects an optical image of light modulated by the light valve onto a screen.

* * * * *